(12) United States Patent
Fujii et al.

(10) Patent No.: US 8,967,350 B2
(45) Date of Patent: Mar. 3, 2015

(54) DRIVING FORCE TRANSMISSION APPARATUS

(75) Inventors: Noriyuki Fujii, Hekinan (JP); Hiroshi Takuno, Nukata-gun (JP); Kunihiko Suzuki, Gamagori (JP); Yuji Tsuzuki, Chiryu (JP)

(73) Assignee: Jtekt Corporation, Osaka-shi (JP)

( * ) Notice: Subject to any disclaimer, the term of this patent is extended or adjusted under 35 U.S.C. 154(b) by 386 days.

(21) Appl. No.: 13/591,782

(22) Filed: Aug. 22, 2012

(65) Prior Publication Data
US 2013/0056321 A1 Mar. 7, 2013

(30) Foreign Application Priority Data

Sep. 1, 2011 (JP) .................................. 2011-190809
Nov. 24, 2011 (JP) .................................. 2011-256579

(51) Int. Cl.
*F16D 27/115* (2006.01)
*F16D 27/12* (2006.01)
*F16D 27/00* (2006.01)

(52) U.S. Cl.
CPC ...... *F16D 27/115* (2013.01); *F16D 2500/5029* (2013.01); *F16D 27/004* (2013.01)
USPC .......... 192/35; 192/48.7; 192/84.6; 192/84.7; 192/70.23

(58) Field of Classification Search
CPC ....... F16D 27/115; F16D 27/12; F16D 28/00; F16D 2500/5029
USPC .............................. 192/35, 48.7, 84.7, 70.23
See application file for complete search history.

(56) References Cited

U.S. PATENT DOCUMENTS

| 5,954,173 A * | 9/1999 | Sakai et al. ...................... 192/35 |
| 6,691,845 B2 * | 2/2004 | Showalter ....................... 192/35 |
| 6,988,604 B2 * | 1/2006 | Kelley, Jr. .................. 192/70.24 |

FOREIGN PATENT DOCUMENTS

JP          2003-14001        1/2003

* cited by examiner

*Primary Examiner* — Jacob S Scott
*Assistant Examiner* — Colby M Hansen
(74) *Attorney, Agent, or Firm* — Oblon, McClelland, Maier & Neustadt, L.L.P.

(57) ABSTRACT

A driving force transmission apparatus includes: a first cam mechanism that converts rotational force from a housing into first cam thrust force used as clutch force of a main clutch when the first cam mechanism is actuated through clutch action of a pilot clutch; and a second cam mechanism that is actuated prior to conversion of the rotational force into the first cam thrust force by the first cam mechanism, and that generates second cam thrust force for reducing an interval between clutch plates of the main clutch. The second cam mechanism includes an input cam member that rotates upon receiving rotational force used as actuating force of the input cam member from a cam actuating driving source, and an output cam member that generates the second cam thrust force between the output cam member and the input cam member and outputs the second cam thrust force.

10 Claims, 15 Drawing Sheets

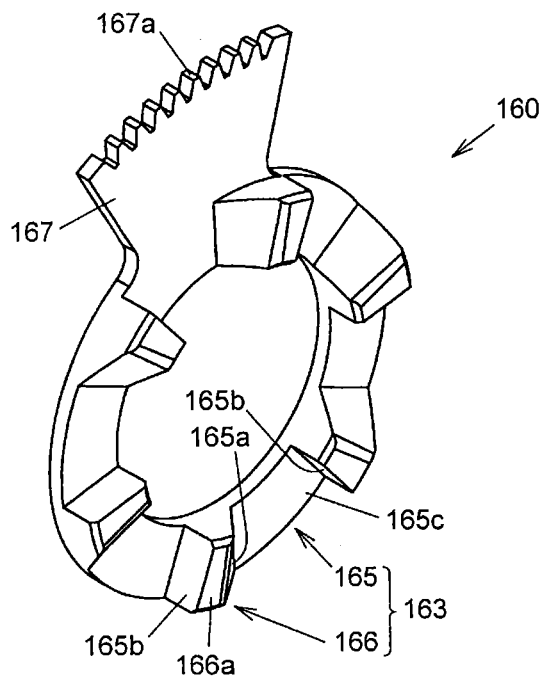
Fig. 6A
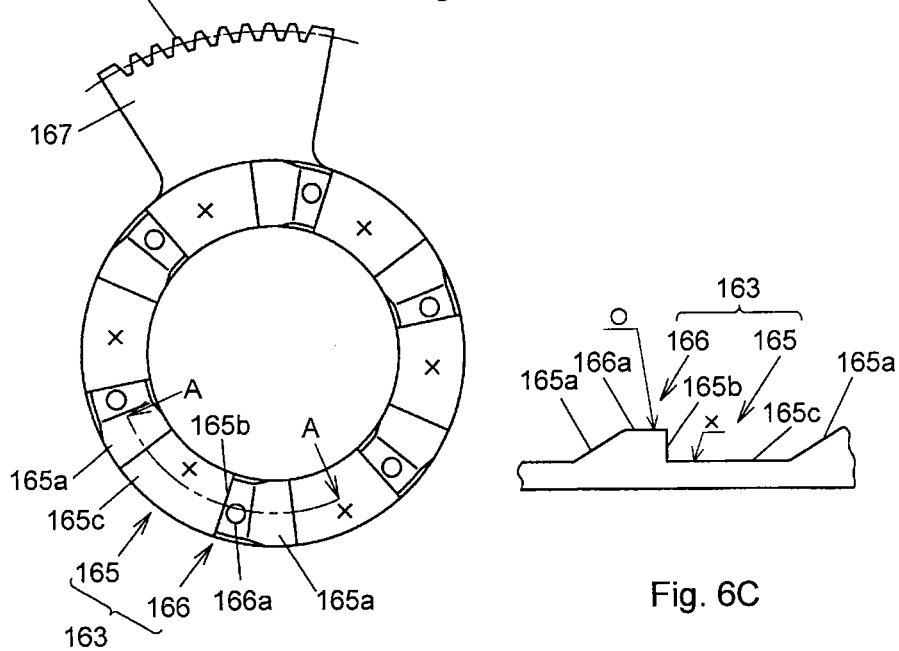
Fig. 6C
Fig. 6B

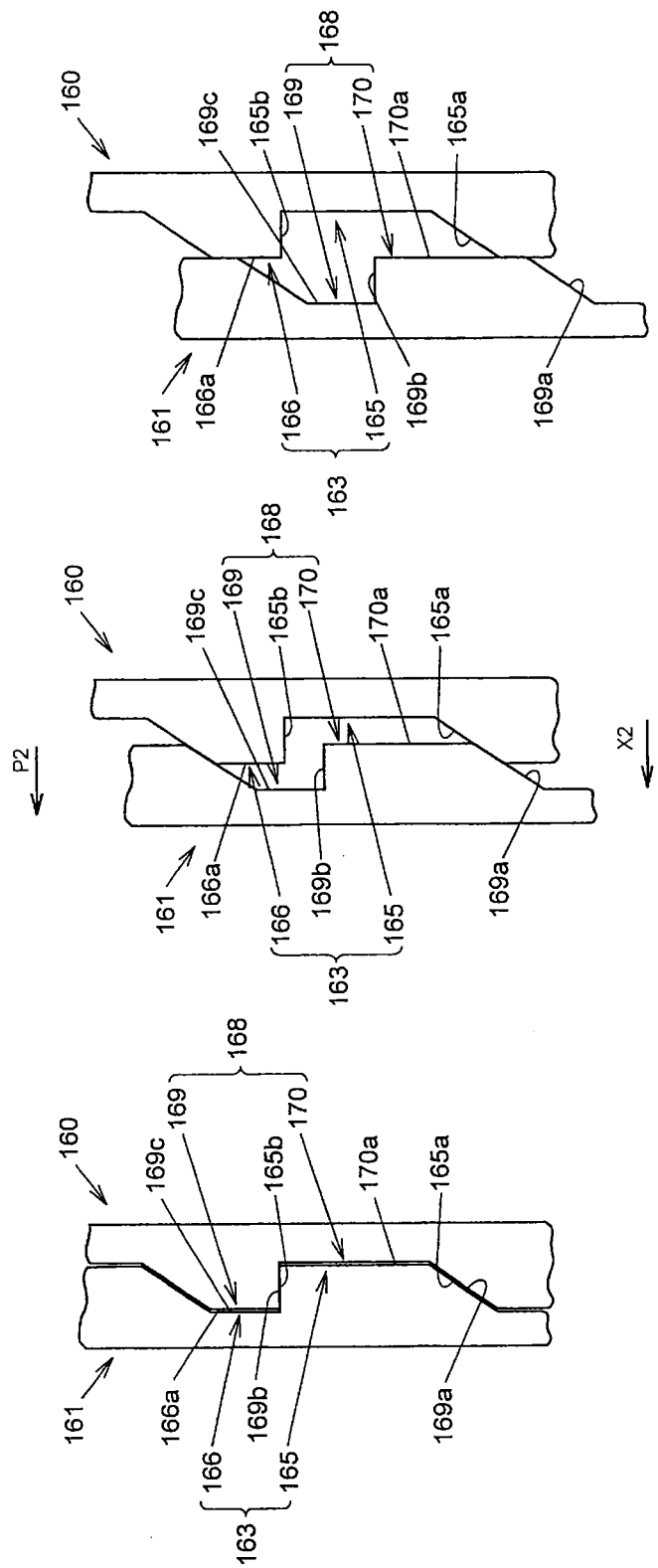

DRIVING FORCE TRANSMISSION APPARATUS

INCORPORATION BY REFERENCE/RELATED APPLICATION

This application claims priority to Japanese Patent Applications No. 2011-190809 filed on Sep. 1, 2011 and No. 2011-256579 filed on Nov. 24, 2011 the disclosure of which, including the specification, drawings and abstract, is incorporated herein by reference in its entirety.

BACKGROUND OF THE INVENTION

1. Field of the Invention

The invention relates to a driving force transmission apparatus.

2. Discussion of Background

Japanese Patent Application Publication No. 2003-014001 (JP 2003-014001 A) describes a conventional driving force transmission apparatus that is mounted in, for example, a four-wheel-drive vehicle, and in which a pair of rotary members are coupled to each other by a clutch so that torque is transmittable between the rotary members.

The driving force transmission apparatus includes a first rotary member, a second rotary member, a friction main clutch, an electromagnetic clutch, a friction pilot clutch, and a cam mechanism. The first rotary member rotates together with an input shaft. The second rotary member is rotatable about the axis of the first rotary member. The friction main clutch couples the second rotary member and the first rotary member to each other so that torque is transmittable therebetween. The electromagnetic clutch is arranged next to the main clutch along the axes of the first rotary member and the second rotary member. The friction pilot clutch is driven upon reception of the electromagnetic force of the electromagnetic clutch. The cam mechanism receives rotational force from the first rotary member due to the clutch action of the pilot clutch, and converts the rotational force into pushing force toward the main clutch.

The first rotary member is formed of a cylindrical front housing and an annular rear housing. The front housing is open at both ends. The rear housing is fitted to a rear opening portion of the front housing. The first rotary member is coupled to the input shaft. The first rotary member is configured to rotate upon receiving the driving force of an engine from the input shaft.

The second rotary member is arranged so as to be rotatable relative to the first rotary member about its rotation axis. The second rotary member is coupled to an output shaft.

The main clutch includes inner clutch plates and outer clutch plates, and is arranged between the first rotary member and the second rotary member. The main clutch is configured such that the inner clutch plates and the outer clutch plates frictionally engage with each other to couple the first rotary member and the second rotary member to each other so that torque is transmittable therebetween.

The electromagnetic clutch is arranged along the axes of the first rotary member and the second rotary member. The electromagnetic clutch is configured to generate electromagnetic force to drive the pilot clutch.

The pilot clutch includes inner clutch plates and outer clutch plates, and is arranged between the main clutch and the electromagnetic clutch. The pilot clutch is configured to apply the rotational force of the first rotary member to the cam mechanism.

The cam mechanism has a pushing portion that applies pushing force to the main clutch through cam action caused by the rotational force from the first rotary member. The cam mechanism is arranged between the first rotary member and the second rotary member.

With the above configuration, when driving force from the engine is input into the first rotary member via the input shaft, the first rotary member rotates about its axis. When current is supplied to the electromagnetic clutch, the pilot clutch is driven by the electromagnetic force of the electromagnetic clutch.

Subsequently, when the cam mechanism receives rotational force from the first rotary member when the pilot clutch is driven, the rotational force is converted into pushing force by the cam mechanism, and the pushing force is applied to the main clutch.

Then, the inner clutch plates and the outer clutch plates of the main clutch approach each other and frictionally engage with each other, and the first rotary member and the second rotary member are coupled to each other through the frictional engagement so that torque is transmittable therebetween. In this way, the driving force of the engine is transmitted from the input shaft to the output shaft via the driving force transmission apparatus.

With the driving force transmission apparatus described in JP 2003-014001 A, while the four-wheel-drive vehicle travels in a two-wheel-drive mode, the cam mechanism receives not only rotational force from the second rotary member but also rotational force from the first rotary member due to so-called drag torque that occurs on the basis of the viscosity of the lubricating oil between the inner clutch plates and the outer clutch plates of the pilot clutch, and the pushing portion of the cam mechanism pushes the main clutch by cam thrust force generated by the rotational force from the first rotary member. Therefore, the main clutch receives pushing force that is amplified by the cam mechanism, and the inner clutch plates and the outer clutch plates of the main clutch frictionally engage with each other. As a result, not only turning performance and fuel economy are adversely influenced but also desirable clutch action of the clutch is not obtained when the four-wheel-drive vehicle shifts from the two-wheel-drive mode to a four-wheel-drive mode.

In order to suppress the above-described adverse influence due to drag torque, for example, the clearance between adjacent two clutch plates of the main clutch may be increased. In this case, however, the response of clutch action of the main clutch decreases.

SUMMARY OF THE INVENTION

The invention provides a driving force transmission apparatus with which drag torque is reduced and the response of clutch action of a main clutch is improved.

According to a feature of an example of the invention, a driving force transmission apparatus includes a first cam mechanism that converts rotational force from a housing into first cam thrust force used as clutch force of a main clutch when the first cam mechanism is actuated through clutch action of a pilot clutch and a second cam mechanism that is actuated prior to conversion of the rotational force into the first cam thrust force by the first cam mechanism. The second cam mechanism generates second cam thrust force for reducing an interval between clutch plates of the main clutch. The second cam mechanism includes an input cam member that rotates upon receiving rotational force used as actuating force of the input cam member from a cam actuating driving source, and an output cam member that generates the second cam thrust force between the output cam member and the input cam member and outputs the second cam thrust force.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 6A to FIG. 6C show an input cam member of a second cam mechanism in the driving force transmission apparatus according to the first embodiment of the invention, wherein FIG. 6A is a perspective view of the input cam member, FIG. 6B is a plan view of the input cam member, and FIG. 6C is a sectional view taken along the line A-A in FIG. 6B;

FIG. 7A to FIG. 7C show an output cam member of the second cam mechanism in the driving force transmission apparatus according to the first embodiment of the invention, wherein FIG. 7A is a perspective view of the output cam member, FIG. 7B is a plan view of the output cam member, and FIG. 7C is a sectional view taken along the line B-B in FIG. 7B;

FIG. 8A to FIG. 8C are sectional views that show operations of the second cam mechanism in the driving force transmission apparatus according to the first embodiment of the invention, wherein FIG. 8A shows a non-operated state, FIG. 8B shows an operated state, and FIG. 8C shows an operation completion state;

FIG. 14A and FIG. 14B show a third element of the rear housing in the driving force transmission apparatus according to the second embodiment of the invention, wherein FIG. 14A shows the third element as viewed from the opposite side of the third element from a first clutch, and FIG. 14B shows the third element as viewed from the first clutch side;

DETAILED DESCRIPTION OF EMBODIMENTS

Hereinafter, embodiments of the invention will be described with reference to the accompanying drawings.

Figure 1:
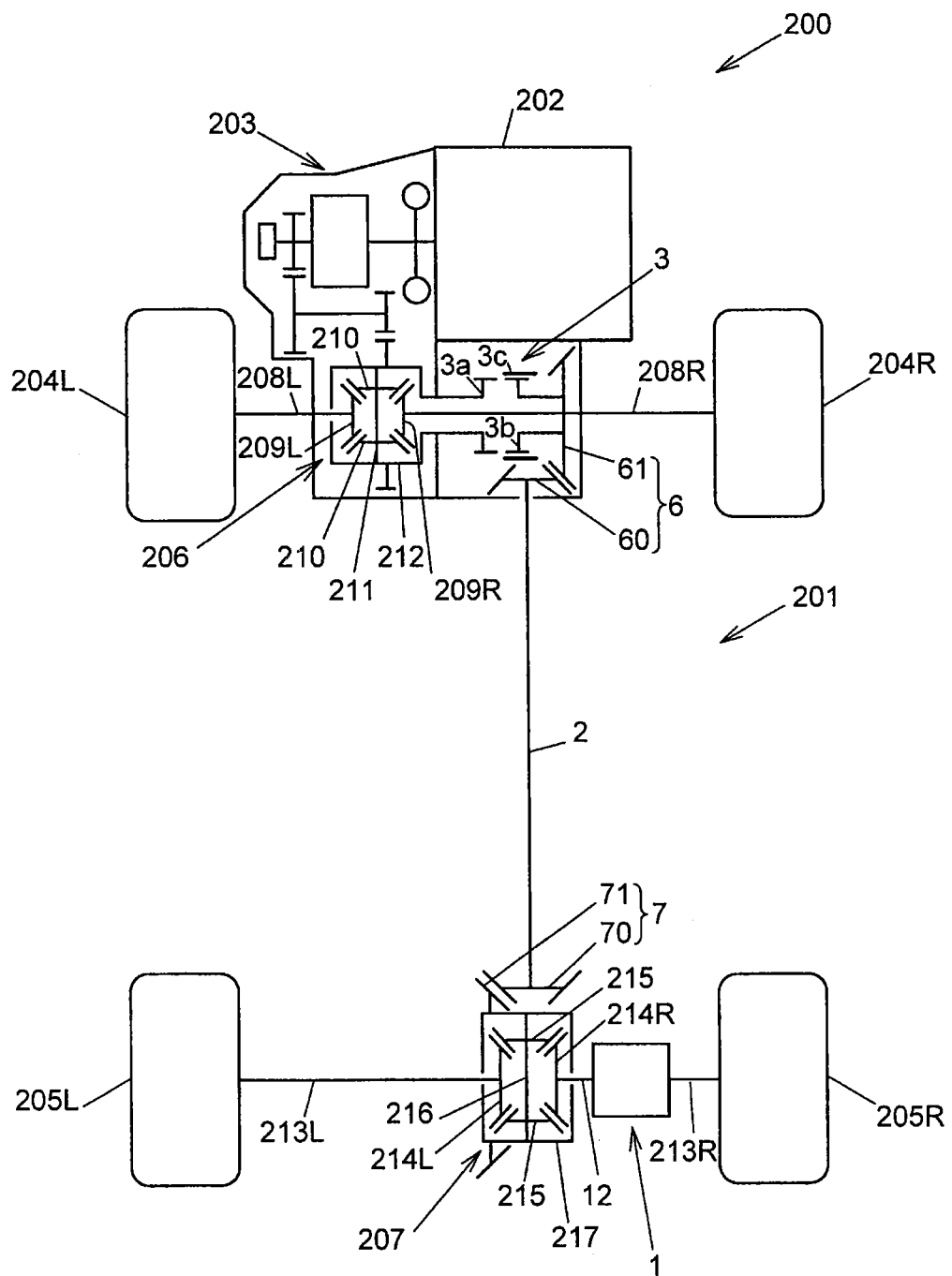
FIG. 1 is a plan view that schematically shows a vehicle in which a driving force transmission apparatus according to a first embodiment of the invention is mounted.

A first embodiment of the invention will be described below. FIG. 1 schematically shows a four-wheel-drive vehicle 200. The four-wheel-drive vehicle 200 includes a driving force transmission system 201, an engine 202, a transmission 203, front wheels 204L, 204R that serve as main drive wheels, and rear wheels 205L, 205R that serve as auxiliary drive wheels.

The driving force transmission system 201 is arranged on a driving force transmission path that extends from the transmission 203 to the rear wheels 205L, 205R in the four-wheel-drive vehicle 200, together with a front differential 206 and a rear differential 207. The driving force transmission system 201 is mounted on a vehicle body (not shown) of the four-wheel-drive vehicle 200.

The driving force transmission system 201 includes a driving force transmission apparatus 1, a propeller shaft 2, and a driving force interrupting device 3. The driving force transmission system 201 is configured to be able to shift the four-wheel-drive vehicle 200 from a four-wheel-drive mode to a two-wheel-drive mode or from the two-wheel-drive mode to the four-wheel-drive mode. The details of the driving force transmission apparatus 1 will be described later.

The front differential 206 includes side gears 209L, 209R, a pair of pinion gears 210, a gear support member 211, and a front differential case 212. The side gears 209L, 209R are coupled to front wheel axle shafts 208L, 208R, respectively. The pinion gears 210 are in mesh with the side gears 209L, 209R with the gear axes arranged perpendicularly to the gear axes of the side gears 209L, 209R. The gear support member 211 supports the pinion gears 210. The front differential case 212 accommodates the gear support member 211, the pinion gears 210, and the side gears 209L, 209R. The front differential 206 is arranged between the transmission 203 and the driving force interrupting device 3.

The rear differential 207 includes side gears 214L, 214R, a pair of pinion gears 215, a gear support member 216, and a rear differential case 217. The side gears 214L, 214R are coupled to rear wheel axle shafts 213L, 213R, respectively. The pinion gears 215 are in mesh with the side gears 214L, 214R with the gear axes arranged perpendicularly to the gear axes of the side gears 214L, 214R. The gear support member 216 supports the pinion gears 215. The rear differential case 217 accommodates the gear support member 216, the pinion gears 215, and the side gears 214L, 214R. The rear differential 207 is arranged between the propeller shaft 2 and the driving force transmission apparatus 1.

The engine 202 outputs driving force to the front wheel axle shafts 208L, 208R via the transmission 203 and the front differential 206 to drive the front wheels 204L, 204R.

In addition, the engine 202 outputs driving force to the left rear wheel axle shaft 213L via the transmission 203, the driving force interrupting device 3, the propeller shaft 2 and the rear differential 207 to drive the left rear wheel 205L, and outputs driving force to the right rear wheel axle shaft 213R via the transmission 203, the driving force interrupting device 3, the propeller shaft 2, the rear differential 207 and the driving force transmission apparatus 1 to drive the right rear wheel 205R.

The propeller shaft 2 is arranged between the driving force transmission apparatus 1 and the driving force interrupting device 3. The propeller shaft 2 is configured to receive the driving force of the engine 202 from the front differential case 212 and transmit the received driving force from the front wheels 204L, 204R-side to the rear wheels 205L, 205R-side.

A front wheel-side gear mechanism 6 is arranged at the front wheel-side end portion of the propeller shaft 2. The front wheel-side gear mechanism 6 is formed of a drive pinion 60 and a ring gear 61 that are in mesh with each other. A rear wheel-side gear mechanism 7 is arranged at the rear wheel-side end portion of the propeller shaft 2. The rear wheel-side gear mechanism 7 is formed of a drive pinion 70 and a ring gear 71 that are in mesh with each other.

The driving force interrupting device 3 is formed of, for example, a dog clutch that has a first spline tooth portion 3*a*, a second spline tooth portion 3*b*, and a sleeve 3*c*. The first spline tooth portion 3*a* is non-rotatable relative to the front differential case 212. The second spline tooth portion 3*b* is non-rotatable relative to the ring gear 61. The sleeve 3*c* is able to be spline-fitted to the first spline tooth portion 3*a* and the second spline tooth portion 3*b*. The driving force interrupting device 3 is arranged on the front wheels 204L, 204R-side in the four-wheel-drive vehicle 200, and is connected to a vehicle ECU (not shown) via an actuator (not shown). The driving force interrupting device 3 is configured to couple the propeller shaft 2 and the front differential case 212 to each other such that the propeller shaft 2 and the front differential case 212 are disengageable from each other.

Figure 2:
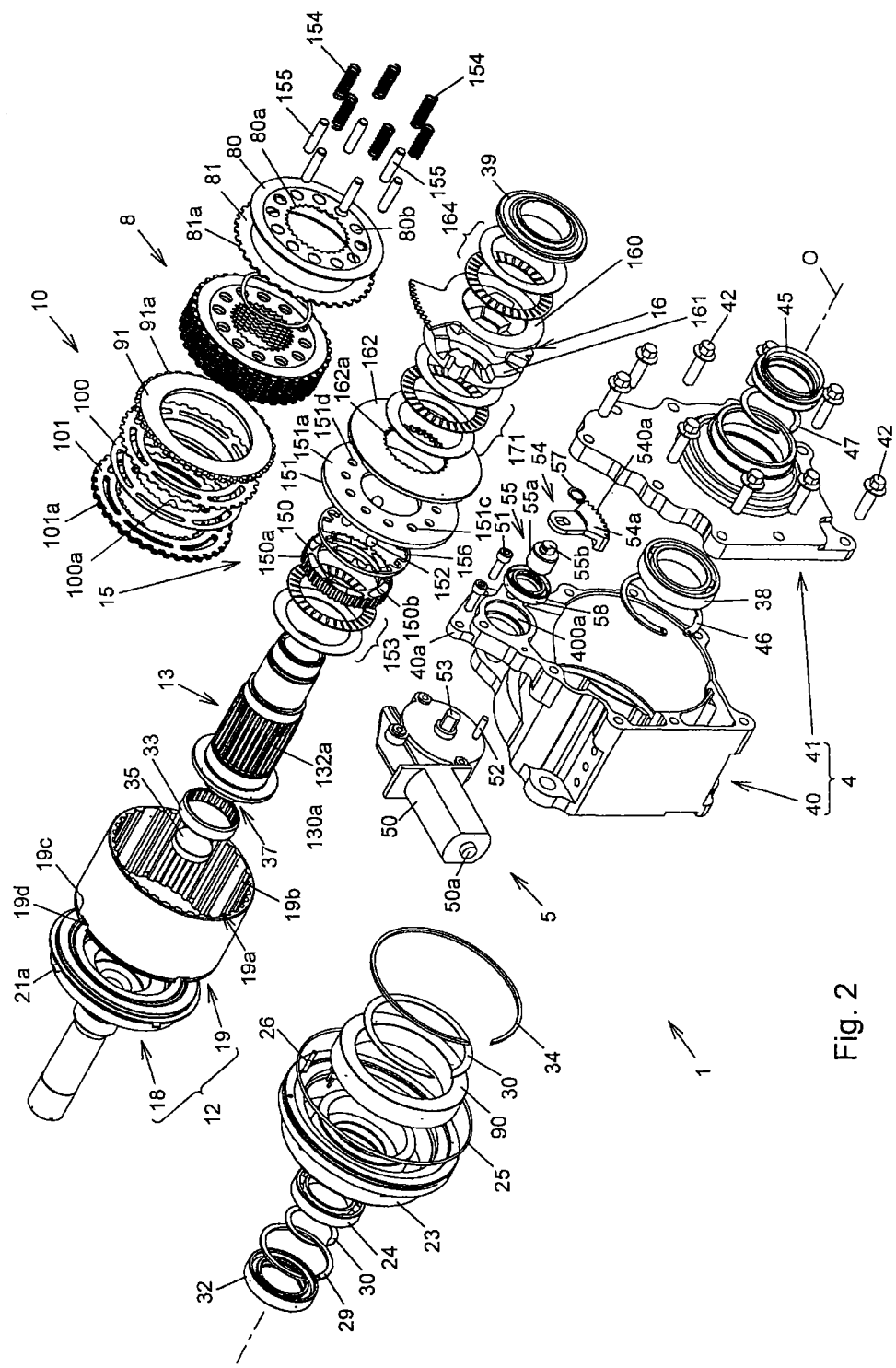
FIG. 2 is an exploded perspective view that shows the entirety of the driving force transmission apparatus according to the first embodiment of the invention.
Figure 3:
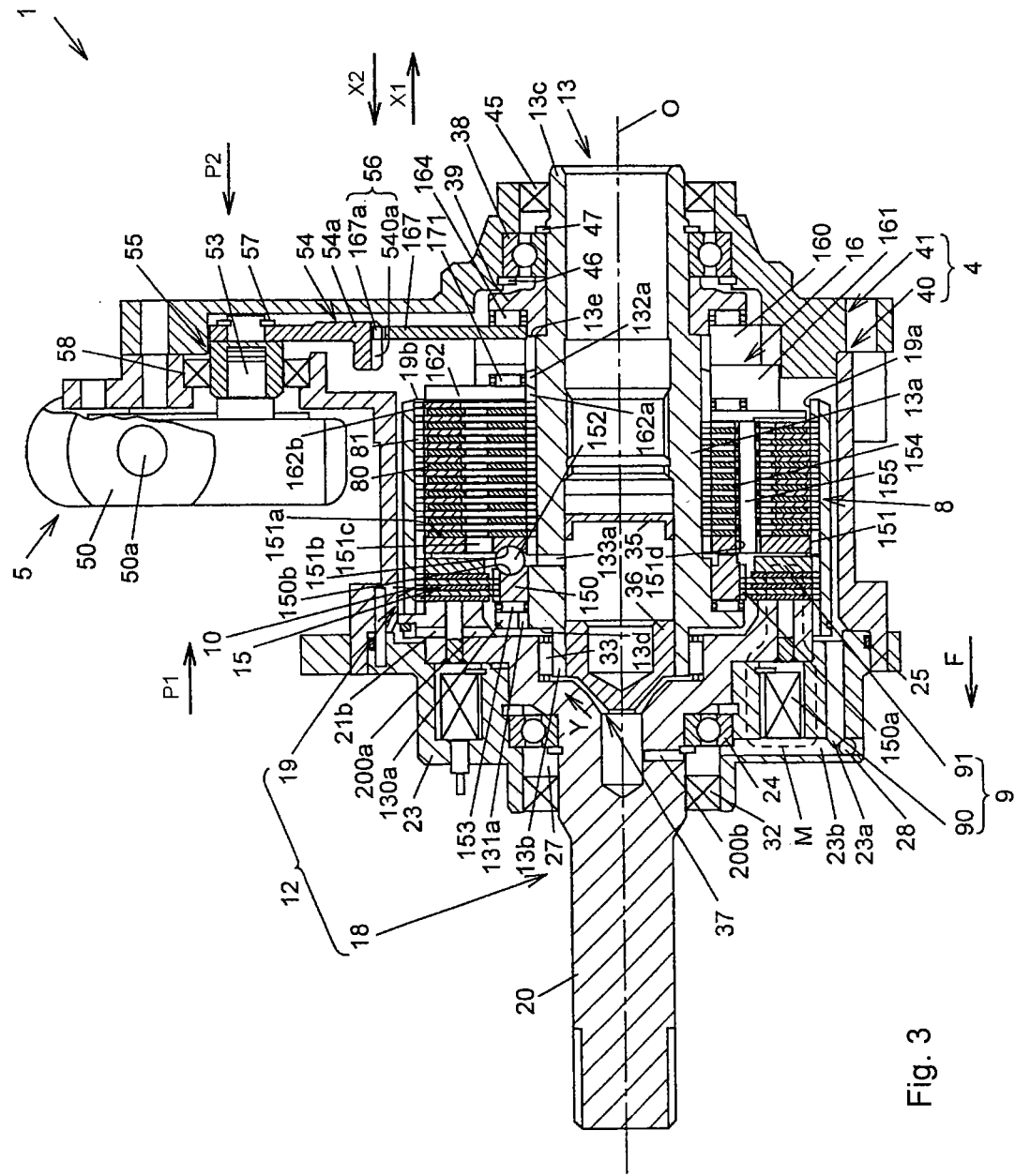
FIG. 3 is a sectional view that shows the entirety of the driving force transmission apparatus according to the first embodiment of the invention, wherein the upper half shows a disconnected state and the lower half shows a connected state.
Figure 4:
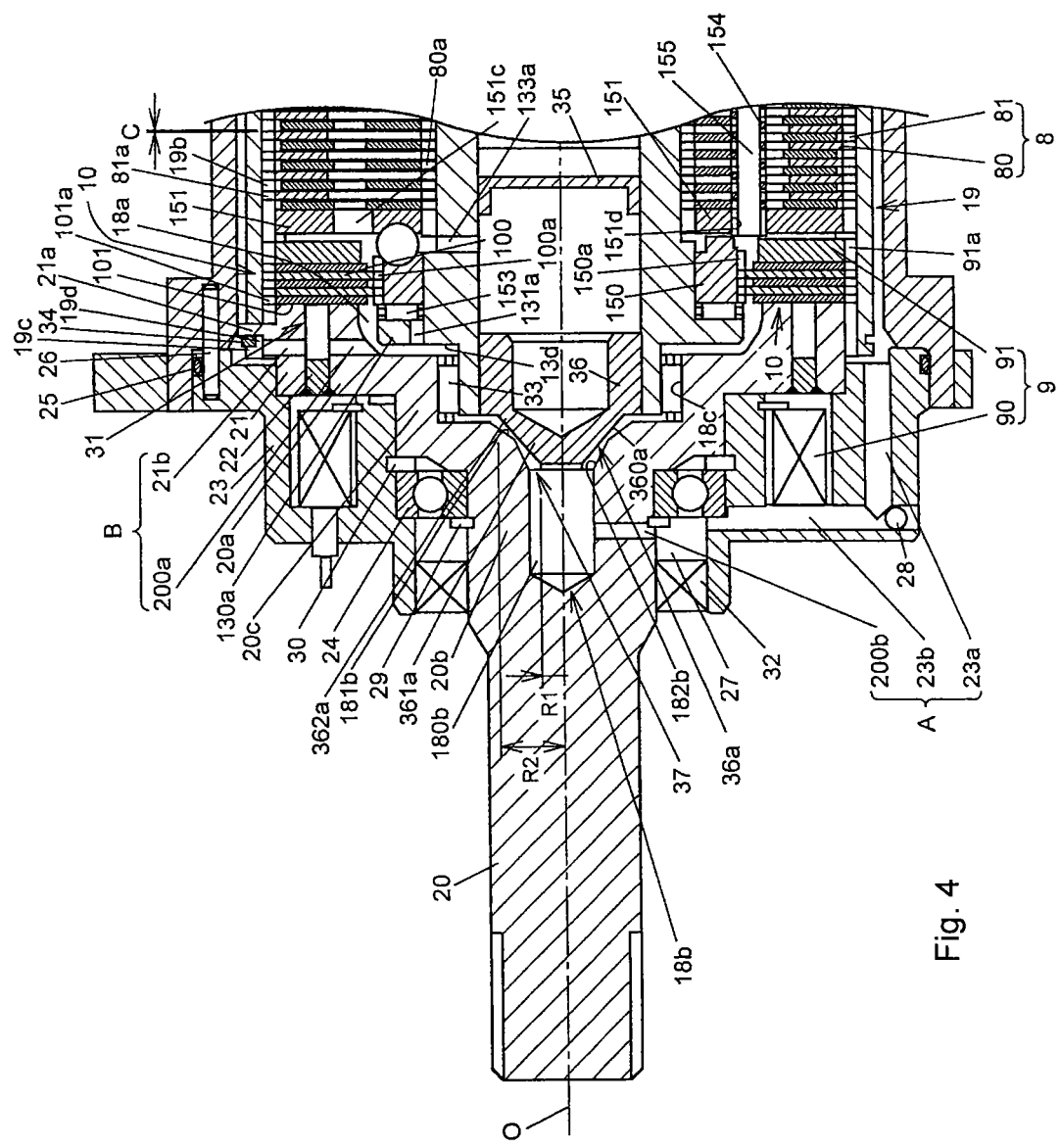
FIG. 4 is a sectional view that shows a pump forming portion of the driving force transmission apparatus according to the first embodiment of the invention.
Figure 5:
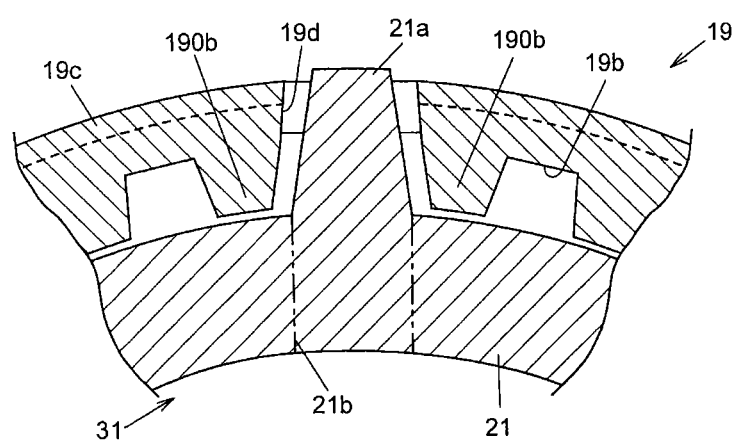
FIG. 5 is a sectional view that shows an oil passage of an oil outlet passage in the driving force transmission apparatus according to the first embodiment of the invention.

The configuration of the entirety of the driving force transmission apparatus 1 will be described below. FIG. 2 and FIG. 3 show the driving force transmission apparatus 1. FIG. 4 shows a pump forming portion. FIG. 5 shows a state where a front housing and a rear housing are fitted to each other. As shown in FIG. 2 and FIG. 3, the driving force transmission apparatus 1 includes a main clutch 8, an electromagnetic clutch 9, a pilot clutch 10, a housing 12, an inner shaft 13, a first cam mechanism 15, and a second cam mechanism 16. The driving force transmission apparatus 1 is arranged on the rear wheel 205R-side in the four-wheel-drive vehicle 200 (shown in FIG. 1), and is accommodated inside an apparatus case 4.

The driving force transmission apparatus 1 is configured to couple the propeller shaft 2 (shown in FIG. 1) and the rear wheel axle shaft 213R (shown in FIG. 1) to each other such that the propeller shaft 2 and the rear wheel axle shaft 213R are disengageable from each other. That is, the rear wheel axle shaft 213R and the propeller shaft 2 are coupled to each other via the driving force transmission apparatus 1. The rear wheel axle shaft 213L and the propeller shaft 2 are coupled to each other without intermediary of the driving force transmission apparatus 1.

With this configuration, when the rear wheel axle shaft 213R is coupled to the propeller shaft 2 by the driving force transmission apparatus 1, the left rear wheel axle shaft 213L is coupled to the propeller shaft 2 via the gear mechanism 7 and the rear differential 207 (both are shown in FIG. 1) such that torque is transmittable therebetween, and the right rear wheel axle shaft 213R is coupled to the propeller shaft 2 via the gear mechanism 7 and the rear differential 207 such that torque is transmittable therebetween. On the other hand, when the rear wheel axle shaft 213R is disengaged from the propeller shaft 2 by the driving force transmission apparatus 1, the left rear wheel axle shaft 213L remains coupled to the propeller shaft 2 via the gear mechanism 7 and the rear differential 207, whereas the right rear wheel axle shaft 213R is disengaged from the propeller shaft 2.

The apparatus case 4 is formed of a case body 40 and a case lid 41. The case body 40 is open toward one side (right side in FIG. 3) in the direction of a rotation axis O. The case lid 41 closes the opening portion of the case body 40. The apparatus case 4 is arranged on the vehicle body of the four-wheel-drive vehicle 200 (shown in FIG. 1).

A fitting portion 40*a* is integrally formed with the case body 40. The fitting portion 40*a* protrudes from the outer face of the case body 40, and a cam actuating driving source 5, which is a component different from the engine 202 (shown in FIG. 1), is fitted to the fitting portion 40*a*. A through-hole 400*a* is formed in the fitting portion 40*a*. The through-hole 400*a* opens toward both sides in an axial direction parallel to the rotation axis O.

The case lid 41 is fastened to the case body 40 with bolts 42. The entirety of the case lid 41 is formed of a cap member through which the inner shaft 13 (described later) is passed.

The driving source 5 includes a speed reduction mechanism (not shown), and has an electric motor 50. The driving source 5 is mounted to the fitting portion 40*a* of the case body 40 with bolts 51. The driving source 5 is fitted to the case body 40 with the use of a positioning pin 52. The speed reduction mechanism is, for example, a gear speed reduction mechanism. The gear speed reduction mechanism includes a worm wheel (not shown) that is fixed to a motor shaft 50*a* of the electric motor 50 and a worm gear 53 that is in mesh with the worm wheel 53. A transmitting member 54 is connected to the driving source 5 (worm gear 53) via a coupling 55. The transmitting member 54 is used to transmit rotational force, which is an actuating force, to the second cam mechanism 16 (described later).

The transmitting member 54 has a curved portion 54*a* having a predetermined curvature radius. The transmitting member 54 is arranged above the second cam mechanism 16, and is accommodated in the apparatus case 4. External teeth 540*a* are formed at the curved portion 54*a*. The external teeth 540*a* constitute part of a gear transmission mechanism 56. A snap ring 57 is used to connect the transmitting member 54 to the coupling 55.

The coupling 55 has a cylindrical portion 55*a* and a shaft portion 55*b*. The cylindrical portion 55*a* is coupled to the worm gear 53 of the speed reduction mechanism. The shaft portion 55*b* is coupled to the transmitting member 54. The coupling 55 is arranged between the worm gear 53 and the transmitting member 54. An oil seal 58 is provided between the outer periphery of the cylindrical portion 55*a* and the inner periphery of the fitting portion 40*a*, which defines the through-hole 400*a*. The snap ring 57 is fitted to the outer periphery of the shaft portion 55*b*.

The configuration of the main clutch 8 will be described below. The main clutch 8 is formed of a friction main clutch that has a plurality of inner clutch plates 80 and a plurality of outer clutch plates 81. The main clutch 8 is arranged between the housing 12 that may function as a first rotary member and the inner shaft 13 that may function as a second rotary member.

The main clutch 8 is configured to couple the housing 12 and the inner shaft 13 to each other such that the housing 12 and the inner shaft 13 are disengageable from each other. When adjacent clutch plates among the inner clutch plates 80 and the outer clutch plates 81 are frictionally engaged with each other, the housing 12 and the inner shaft 13 are coupled to each other, whereas when the adjacent clutch plates are disengaged from each other, the housing 12 and the inner shaft 13 are disengaged from each other.

The inner clutch plates 80 and the outer clutch plates 81 are alternately arranged along the rotation axis O, and each are formed of an annular friction plate. The clearance between adjacent two clutch plates among the inner clutch plates 80 and the outer clutch plates 81 is set to such a size that the clutch plates do not frictionally engage with each other by drag torque based on the viscosity of the lubricating oil when the four-wheel-drive vehicle 200 (shown in FIG. 1) travels in the two-wheel-drive mode.

Each of the inner clutch plates 80 has a spline portion 80a at its inner peripheral portion. The inner clutch plates 80 are coupled to the inner shaft 13 by engaging the spline portions 80a with a spline portion 132a of a cylindrical portion 13a of the inner shaft 13. In this way, the inner clutch plates 80 are non-rotatable and movable relative to the inner shaft 13.

A plurality of oil holes 80b is formed in the inner clutch plates 80. The oil holes 80b are arranged in the circumferential direction of the inner clutch plates 80, and are open toward both sides in the direction of the rotation axis O. Among the inner clutch plates 80, the inner clutch plate closest to the electromagnetic clutch 9 functions as a first input portion of the main clutch 8. When this inner clutch plate receives pushing force (first cam thrust force) P1 toward the outer clutch plate 81, from a main cam 151 (described later) of the first cam mechanism 15, the inner clutch plates 80 and the outer clutch plates 81 that are adjacent to each other are frictionally engaged with each other by movement of the inner clutch plate in the pushing direction. In addition, among the inner clutch plates 80, the inner clutch plate farthest from the electromagnetic clutch 9 functions as a second input portion of the main clutch 8. When the this inner clutch plate receives pushing force (second cam thrust force) P2 toward the outer clutch plate 81, from an output cam member 161 (described later) of the second cam mechanism 16 via a pushing member 162 (described later), a clearance C between the inner clutch plates 80 and the outer clutch plates 81 that are adjacent to each other is reduced to, for example, 0 (C=0) by movement of the inner clutch plate in the pushing direction.

Each of the outer clutch plates 81 has a spline portion 81a at its outer peripheral portion. The outer clutch plates 81 are coupled to the housing 12 by engaging the spline portions 81a with a spline portion 19b (described later) of the rear housing 19. In this way, the outer clutch plates 81 are non-rotatable and movable relative to the housing 12.

The configuration of the housing 12 will be described below. The housing 12 is formed of the front housing 18 and the rear housing 19. The housing 12 is arranged on the axis (rotation axis O) of the right rear wheel axle shaft 213R (shown in FIG. 1), and is coupled to the side gear 214R (shown in FIG. 1).

The front housing 18 is formed of first to third housing elements 20 to 22. The front housing 18 is connected to the inner periphery of the opening portion of the rear housing 19, and is rotatably supported by a coil holder 23 via a bearing 24.

An O-ring 25 is fitted between the outer periphery of the coil holder 23 and the inner periphery of the apparatus case 4. The entirety of the coil holder 23 is formed of a flanged annular member through which the front housing 18 is passed. The coil holder 23 is fitted to the apparatus case 4 with the use of a positioning pin 26. In addition, an annular space 27 is formed between the inner periphery of the coil holder 23 and the outer periphery of the front housing 18 (first housing element 20). An oil passage 23a and an oil passage 23b are formed in the coil holder 23. The oil passage 23a is open into the inside of the apparatus case 4. The oil passage 23b is in communication with the oil passage 23a, and is open into the annular space 27. The oil passage 23a is formed along an axis parallel to the axis of the coil holder 23. The oil passage 23b is formed along an axis perpendicular to the axis of the oil passage 23a. A ball-shaped stopper 28 is provided in the oil passage 23b. The stopper 28 is used to prevent leakage of the lubricating oil to the outside of the coil holder 23.

Axial movement of the bearing 24 is restricted by snap rings 29, 30. The bearing 24 is arranged in the annular space 27.

As shown in FIG. 4, three holes 18a to 18c are formed in the front housing 18. The holes 18a to 18c are open toward the rear housing 19, and have inner diameters different from one another. The inner diameter of the hole 18a is set to the largest size (largest inner diameter) among the inner diameters of the holes 18a to 18c. The inner diameter of the hole 18b is set to the smallest size (smallest inner diameter) among the inner diameters of the holes 18a to 18c. The inner diameter of the hole 18c is set to a size (intermediate inner diameter) intermediate between the inner diameter of the hole 18a and the inner diameter of the hole 18b.

Among these holes 18a to 18c, the hole 18b having the smallest inner diameter is formed of a first space 180b, a second space 181b and a third space 182b. The first space 180b serves as an oil reservoir space having a uniform inner diameter in its axial direction. The inner diameter of the second space 181b gradually increases from the first space 180b-side toward the hole 18c. The inner diameter of the third space 182b gradually increases from the first space 180b toward the second space 181b. With this configuration, the minimum inner diameter of the second space 181b is set to the same size as the maximum inner diameter of the third space 182b, and the minimum inner diameter of the third space 182b is set to the same size as the inner diameter of the first space 180b. In the inner periphery of the front housing 18, which defines the hole 18b, a portion that defines the second space 181b is formed of a tapered surface that has a gradient greater than the gradient of a portion that defines the third space 182b. In the inner periphery of the front housing 18, which defines the hole 18b, the portions that defines the second space 181b and the third space 182b function as the pump forming portion.

The first housing element 20 has three body portions 20a to 20c having outer diameters different from one another. The first housing element 20 is arranged at the inner peripheral side of the front housing 18. The entirety of the first housing element 20 is formed of a shaft member that is made of a magnetic material, such as iron.

The outer diameter of the body portion 20a is set to the largest size (largest outer diameter) among the diameters of the body portions 20a to 20c. The outer diameter of the body portion 20b is set to the smallest size (smallest outer diameter) among the diameters of the body portions 20a to 20c. The outer diameter of the body portion 20c is set to a size (intermediate side) intermediate between the outer diameter of the body portion 20a and the outer diameter of the body portion 20b. The hole 18a is located inside the body portion 20a having the largest outer diameter. The hole 18b is located inside the body portion 20b having the smallest outer diameter. The hole 18c is arranged inside the body portion 20c having the intermediate outer diameter.

An annular space 31 is formed between the outer periphery of the body portion 20a and the inner periphery of the second housing element 21. An oil passage 200a is formed in the body portion 20a. The oil passage 200a is open into the annular space 31 and the hole 18a.

An oil seal 32 is arranged between the outer periphery of the body portion 20b and the inner periphery of the coil holder 23. An oil passage 200b is formed in the body portion 20b. The oil passage 200b is open into the annular space 27 and the hole 18b. The oil passage 200b constitutes an oil inlet passage A together with the oil passages 23a and 23b. Through the oil inlet passage A, the lubricating oil in the apparatus case 4 flows into the first space 180b.

A bearing 33 is arranged between the inner periphery of the body portion 20c and the outer periphery of the inner shaft 13.

The second housing element 21 is arranged at the outer peripheral side of the front housing 18. The entirety of the second housing element 21 is formed of a cylindrical member that is made of a magnetic material, such as iron, like the first housing element 20. A plurality of (four in the present embodiment) engaging protrusions 21a are formed on the outer periphery of the second housing element 21. The engaging protrusions 21a protrude radially outward. The engaging protrusions 21a are arranged at equal intervals in the circumferential direction of the second housing element 21. The oil passage 200a and an oil passage 21b are formed in the second housing element 21. The oil passage 200a and the oil passage 21b are open at the outer periphery of the second housing element 21 and open into the annular space 31. The oil passage 200a and the oil passage 21b constitute an oil outlet passage B. Through the oil outlet passage B, the lubricating oil in the hole 18a is discharged into the apparatus case 4 (to the outside of the housing 12).

The third housing element 22 is arranged between the first housing element 20 and the second housing element 21, and is formed of a housing element coupling annular member made of a non-magnetic material, such as stainless steel.

The rear housing 19 has an accommodating space 19a and the spline portion 19b. The accommodating space 19a is open toward the front housing 18 and toward the opposite side of the rear housing 19 from the front housing 18. The spline portion 19b is exposed to the accommodating space 19a. The rear housing 19 is accommodated in the apparatus case 4, and is formed of a cylindrical member having openings at both ends. A flange 19c is formed on the outer periphery of the rear housing 19 at the coil holder 23-side. The flange 19c protrudes from the outer periphery of the rear housing 19. In addition, a plurality of (four in the present embodiment) engagement recesses 19d are formed in the rear housing 19. The engaging protrusions 21a of the front housing 18 (second housing element 21) are engaged with the engagement recesses 19d. The rear housing 19 is configured to rotate around the rotation axis O together with the front housing 18.

As shown in FIG. 5, each engagement recess 19d is formed by partially cutting out the opening periphery on the coil holder 23-side and the flange 19c of the rear housing 19, at a portion between two adjacent spline teeth among a plurality of spline teeth 190b of the spline portion 19b. A snap ring 34 is fitted to the outer periphery of the rear housing 19, at a position between the flange 19c and the engaging protrusions 21a.

The configuration of the inner shaft 13 will be described below. The inner shaft 13 has three cylindrical portions 13a to 13c, a step face 13d, and a step face 13e. The cylindrical portions 13a to 13c have outer diameters different from one another. The step face 13d is formed between the cylindrical portions 13a and 13b. The step face 13e is formed between the cylindrical portions 13a and 13c. The inner shaft 13 is arranged along the rotation axis O of the housing 12. The entirety of the inner shaft 13 is formed of a cylindrical member that is open toward both sides in the axial direction. The outer diameter of the cylindrical portion 13a is set to the largest size (largest outer diameter) among the outer diameters of the three cylindrical portions 13a to 13c. The outer diameter of the cylindrical portion 13b is set to the smallest size (smallest outer diameter) among the outer diameters of the three cylindrical portions 13a to 13c. The outer diameter of the cylindrical portion 13c is set to a size (intermediate outer diameter) intermediate between the outer diameter of the cylindrical portion 13a and the outer diameter of the cylindrical portion 13b. The inner shaft 13 is configured such that the distal end portion of the rear wheel axle shaft 213R (shown in FIG. 1) is inserted and accommodated in the opening portion of the inner shaft 13. The rear wheel axle shaft 213R is coupled to the inner shaft 13 by spline-fitting so as to be non-rotatable and movable relative to the inner shaft 13.

The cylindrical portion 13a having the largest outer diameter is located at the axially center portion of the inner shaft 13, which is between the cylindrical portion 13b having the smallest outer diameter and the cylindrical portion 13c having the intermediate outer diameter. A flange 130a is integrally formed with the outer periphery of the cylindrical portion 13a having the largest outer diameter. Within the hole 18a, the flange 130a protrudes from the outer periphery of the cylindrical portion 13a, at a position on the front housing 18-side. An oil flow passage 131a is formed in the flange 130a. The oil flow passage 13a is open at both end faces of the flange 130a. Through the oil flow passage 13a, the lubricating oil flows between the oil inlet passage A and the oil outlet passage B.

In addition, the spline portion 132a is formed on the outer periphery of the cylindrical portion 13a having the largest outer diameter. The spline portion 132a is exposed to the accommodating space 19a of the rear housing 19, and is fitted to the spline portions 80a of the inner clutch plates 80 of the main clutch 8.

A cap 35 is fitted to the inner periphery of the cylindrical portion 13a having the largest outer diameter. The cap 35 is used to prevent the lubricating oil from flowing out of the apparatus case 4. An oil passage 133a is formed in the cylindrical portion 13a having the largest outer diameter. The oil passage 133a is open at the inner and outer peripheries of the cylindrical portion 13a, at a position between the cap 35 and the flange 130a.

The cylindrical portion 13b having the smallest outer diameter is located at one end side (left side in FIG. 3) of the inner shaft 13, and is rotatably supported inside the hole 18c of the front housing 18 via the bearing 33. A closed-end cylindrical shaft lid 36 is fitted to the cylindrical portion 13b having the smallest outer diameter. The shaft lid 36 closes an opening portion of the cylindrical portion 13b, which is on the front housing 18-side.

A tapered pump forming portion 36a is integrally formed with the shaft lid 36. The pump forming portion 36a has an outer periphery 360a. The outer periphery 360a faces the inner periphery of the front housing 18 (first housing element 20), which defines the hole 18b, at a portion that defines the second space 181b, and forms a pump between the outer periphery 360a and the portions that define the second space 181b and the third space 182b. An annular space 37 is formed between the outer periphery 360a of the pump forming portion 36a and the inner periphery of the first housing element 20. Through the annular space 37, the lubricating oil is introduced from the hole 18b (first space 180b) side into the hole 18c to be supplied to, for example, the bearing 33. The annular space 37 is set to such dimensions that the inside and outer diameters gradually increase from the oil inlet (introduction) side toward the oil outlet (discharge) side.

The pump forming portion 36a is set to such dimensions that a length R1 from an oil introduction-side end portion 361a to the rotation axis O is smaller than a length R2 from an oil discharge-side end portion 362a to the rotation axis O (R1<R2). The outer diameter of the pump forming portion 36a is set to gradually increase from the oil introduction-side end portion 361a toward the oil discharge-side end portion 362a. Therefore, when the inner shaft 13 rotates, the peripheral velocity of the outer periphery 360a of the pump forming portion 36a gradually increases from the oil introduction-side end portion 361a toward the oil discharge-side end portion 362a. Therefore, the pressure in the annular space 37 gradually decreases from the oil introduction side toward the oil discharge side, and pumping action with suction force in the direction of an arrow Y occurs between the outer periphery 360a of the pump forming portion 36a and the inner periphery of the first housing element 20 (the portions that form the second space 181b and the third space 182b). As a result, the lubricating oil that has flowed into the hole 18b (first space 180b) of the front housing 18 is introduced into the second space 181b and the third space 182b (annular space 37), and then the lubricating oil flows through the annular space 37 and is discharged into the hole 18c.

The cylindrical portion 13c having the intermediate outer diameter is located at the other end side (right side in FIG. 3) of the inner shaft 13, and is rotatably supported by the inner periphery of the apparatus case 4 (case lid 41) via a bearing 38. A cylindrical receiving member 39 is fitted to the outer periphery of the cylindrical portion 13c having the intermediate outer diameter. The receiving member 39 is interposed between the bearing 38 and the step face 13e. An oil seal 45 is arranged at the distal end portion of the cylindrical portion 13c having the intermediate outer diameter. The oil seal 45 is interposed between the outer periphery of the cylindrical portion 13c and the inner periphery of the case lid 41. Axial movement of the bearing 38 is restricted by snap rings 46 and 47. The bearing 38 is arranged between the outer periphery of the cylindrical portion 13c having the intermediate outer diameter and the inner periphery of the case lid 41.

The configuration of the electromagnetic clutch 9 will be described below. The electromagnetic clutch 9 includes an electromagnetic coil 90 and an armature 91. The electromagnetic clutch 9 is arranged next to the main clutch 8 along the rotation axis O of the housing 12. The electromagnetic clutch 9 is configured such that the first cam mechanism 15 is actuated by movement of the armature 91 toward the electromagnetic coil 90 due to generation of electromagnetic force F while the housing 12 is rotating and the inner clutch plates 80 and outer clutch plates 81 of the main clutch 8 are frictionally engaged with each other.

The electromagnetic coil 90 is connected to the vehicle ECU, and is retained inside the coil holder 23. The electromagnetic coil 90 is configured to form a magnetic circuit M over the front housing 18, the armature 91, and the like, by being supplied with current and generate electromagnetic force F for applying force to the armature 91 to move the armature 91 toward the front housing 18.

The armature 91 has a spline portion 91a at its outer periphery. When the spline portion 91a is fitted to the spline portion 19b, the armature 91 is coupled to the rear housing 19. In this way, the armature 91 is non-rotatable and movable relative to the rear housing 19. The armature 91 is interposed between the first cam mechanism 15 (main cam 151) and the pilot clutch 10, and is accommodated in the accommodating space 19a of the rear housing 19. The entirety of the armature 91 is formed of an annular plate that is made of a magnetic material, such as iron. The armature 91 is configured to move along the rotation axis O toward the front housing 18 upon reception of the electromagnetic force F of the electromagnetic coil 90.

The configuration of the pilot clutch 10 will be described below. The pilot clutch 10 includes inner clutch plates 100 and outer clutch plates 101 formed of annular friction plates. The inner clutch plates 100 and the outer clutch plates 101 are frictionally engaged with each other as the armature 91 moves toward the electromagnetic coil 90 due to supply of current to the electromagnetic clutch 9. The pilot clutch 10 is arranged between the armature 91 and the front housing 18, and is accommodated in the accommodating space 19a of the rear housing 19. The pilot clutch 10 is configured to couple the rear housing 19 and the first cam mechanism 15 (pilot cam 150) to each other such that the rear housing 19 and the first cam mechanism 15 are disengageable from each other. When adjacent clutch plates among the inner clutch plates 100 and the outer clutch plates 101 are frictionally engaged with each other, the rear housing 19 and the first cam mechanism 15 are coupled to each other, whereas when the adjacent clutch plates are disengaged from each other, the rear housing 19 and the first cam mechanism 15 are disengaged from each other.

The inner clutch plates 100 and the outer clutch plates 101 are alternately arranged along the rotation axis O, and each are formed of an annular friction plate.

Each inner clutch plate 100 has a spline portion 100a at its inner peripheral portion. The inner clutch plates 100 are coupled to the pilot cam 150 by engaging the spline portions 100a with a spline portion 150a of the pilot cam 150. In this way, the inner clutch plates 100 are non-rotatable and movable relative to the pilot cam 150.

Each outer clutch plate 101 has a spline portion 101a at its outer peripheral portion. The outer clutch plates 101 are coupled to the rear housing 19 by engaging the spline portions 101a with the spline portion 19b. In this way, the outer clutch plates 101 are non-rotatable and movable relative to the rear housing 19.

The configuration of the first cam mechanism 15 will be described below. The first cam mechanism 15 includes the input pilot cam 150, the output main cam 151 and a plurality of (six in the present embodiment) spherical cam followers 152. The pilot cam 150 rotates upon reception of rotational force from the housing 12 (rear housing 19). The main cam 151 is arranged next to the pilot cam 150 along the rotation axis O. The cam followers 152 are interposed between the main cam 151 and the pilot cam 150. The first cam mechanism 15 is arranged between the main clutch 8 and the front housing 18, and is accommodated in the accommodating space 19a of the rear housing 19. The first cam mechanism 15 is configured to convert rotational force received from the housing 12 through clutch action of the electromagnetic clutch 9 into pushing force (first cam thrust force) P1 that becomes the clutch force of the main clutch 8.

The pilot cam 150 has the spline portion 150a at its outer peripheral portion. The spline portion 150a is engaged with the spline portions 100a of the inner clutch plates 100. The pilot cam 150 is rotatably supported by the flange 130a of the inner shaft 13 (cylindrical portion 13a) via a bearing 153. The entirety of the pilot cam 150 is formed of an annular member through which the inner shaft 13 is passed. The pilot cam 150 is configured to generate the first cam thrust force P1 between the pilot cam 150 and the main cam 151 and output the first cam thrust force P1 to the main clutch 8.

A plurality of (six in the present embodiment) cam grooves 150b are formed in the pilot cam 150. The cam grooves 150b are arranged in the circumferential direction, and are open toward the cam followers 152. The cam grooves 150b are arranged at equal intervals in the circumferential direction of the pilot cam 150. Each cam groove 150b is formed such that the axial depth becomes gradually shallower from the neutral position along the circumferential direction of the pilot cam 150.

The main cam 151 has a clutch plate pushing portion 151a, on the main clutch 8-side. The main cam 151 is arranged along the rotation axis O so as to be movable relative to the inner shaft 13 (the cylindrical portion 13a having the largest outer diameter). The entirety of the main cam 151 is formed of an annular member through which the inner shaft 13 is passed. The main cam 151 is configured to move toward the main clutch 8 upon receiving, from the cam followers 152, the first cam thrust force P1 that is generated by the cam action of the first cam mechanism 15, that is, by the rotation of the pilot cam 150 when the electromagnetic coil 90 is supplied with current, and to push the clutch plate pushing portion 151a against the input-side inner clutch plate 80 of the main clutch 8, at the one end side (left side in FIG. 3) in the direction of the rotation axis O.

A plurality of (six in the present embodiment) cam grooves 151b are formed in the main cam 151. The cam grooves 151b are arranged at equal intervals in the circumferential direction, and are open toward the cam followers 152. Each cam groove 151b is formed such that the axial depth becomes gradually shallower from the neutral position along the circumferential direction of the main cam 151. A plurality of (six in the present embodiment) of oil holes 151c and a plurality of (six in the present embodiment) of pin fitting holes 151d are formed in the main cam 151. The oil holes 151c are open toward both sides in a direction parallel to the rotation axis O. The pin fitting holes 151d are open in a direction opposite to the direction in which the cam grooves 151b are open. The oil holes 151c and the pin fitting holes 151d are alternately arranged at equal intervals in the circumferential direction of the main cam 151.

Guide pins 155 are fitted in the respective pin fitting holes 151d. The guide pins 155 guide the spring forces of return springs 154 interposed between the main cam 151 and the pushing member 162 (the output cam member 161 in the second cam mechanism 16). Thus, the spring forces of the return springs 154 act in such a direction that the main cam 151 and the output cam member 161 move away from each other, and the clearance between adjacent two clutch plates among the inner clutch plates 80 and the outer clutch plates 81 is set to such a size that the clutch plates are not frictionally engaged with each other by drag torque based on the viscosity of the lubricating oil when the four-wheel-drive vehicle 200 (shown in FIG. 1) travels in the two-wheel-drive mode.

The cam followers 152 are arranged between the cam grooves 150b of the pilot cam 150 and the cam grooves 151b of the main cam 151. The cam followers 152 are rollably retained by a retainer 156.

The configuration of the second cam mechanism 16 will be described. As shown in FIG. 2 to FIG. 4, the second cam mechanism 16 includes an input cam member 160 and the output cam member 161. The input cam member 160 rotates upon receiving rotational force, which is actuating force, from the driving source 5. The output cam member 161 is arranged next to the input cam member 160 along the rotation axis O. The second cam mechanism 16 is arranged at a position at which the second cam mechanism 16 faces the first cam mechanism 15 via the main clutch 8 along the rotation axis O. The second cam mechanism 16 is configured to be actuated prior to the conversion of the rotational force into the first cam thrust force P1 by the first cam mechanism 15, and to generate second cam thrust force P2 between the input cam member 160 and the output cam member 161. The cam thrust force P2 is directed in a direction opposite to the direction of the first cam thrust force P1. With the cam thrust force P2, the pushing member 162 is pushed against the main clutch 8 to reduce the clearance C between adjacent two clutch plates among the inner clutch plates 80 and the outer clutch plates 81 to, for example, 0 (C=0).

FIG. 6A to FIG. 6C show the input cam member 160. As shown in FIG. 3 and FIG. 6A to FIG. 6C, the input cam member 160 has a corrugated surface 163, on the side that faces the output cam member 161. The input cam member 160 is coupled to the transmitting member 54 via the gear transmission mechanism 56. The input cam member 160 is rotatably supported by the receiving member 39 via a bearing 164. The entirety of the input cam member 160 is formed of an annular member through which the inner shaft 13 is passed.

The corrugated surface 163 has recesses 165 and projections 166 that are alternately arranged in the circumferential direction of the input cam member 160. The corrugated surface 163 is formed of a cam surface. Therefore, as the corrugated surface 163 and a corrugated surface 168 of the output cam member 161, shown in FIG. 7A to FIG. 7C, move relative to each other in the circumferential direction, the corrugated surface 163 and the corrugated surface 168 move relative to each other in the axial direction. In the present embodiment, the corrugated surface 163 is formed of a cam surface for moving the output cam member 161 toward the main clutch 8 in the direction along the axis (rotation axis O) in accordance with the rotation of the input cam member 160.

Each recess 165 is formed of a cutout that has a trapezoidal cross section. The cutout has a pair of cutout side faces 165a, 165b, and a cutout bottom face (indicated by "x") 165c. The cutout side faces 165a, 165b are formed such that the cutout width (distance between the cutout side faces 165a, 165b) is gradually increased from one axial side of the input cam member 160 toward the other axial side of the input cam member 160 (toward the output cam member 161). The cutout bottom face 16c is located between the cutout side faces 165a, 165b.

The cutout side face 165a is located at one side of the cutout bottom face 165c in the circumferential direction around the rotation axis O, and inclined relative to the cutout bottom face 165c. The cutout side face 165a is configured to function as a cam. The cutout side face 165b is located at the other side of the cutout bottom face 165c in the circumferential direction around the rotation axis O, and perpendicular to the cutout bottom face 165c. The cutout side face 165b is configured to function as a stopper.

Each projection 166 is formed of a projection that has a trapezoidal shape in cross section, and that has the cutout side face 165a, which functions as a cam in one of the two adjacent recesses 165, the cutout side face 165b, which functions as a stopper in the other one of the adjacent recesses 165, and an end face (indicated by "0") 166a located between these cutout side faces 165a, 165b.

A sectoral protruding piece 167 is integrally formed with the input cam member 160. The protruding piece 167 protrudes along the outer periphery of the input cam member 160. External teeth 167a are formed in the protruding piece 167. The external teeth 167a are in mesh with the external teeth 540a of the transmitting member 54.

Figure 7A:
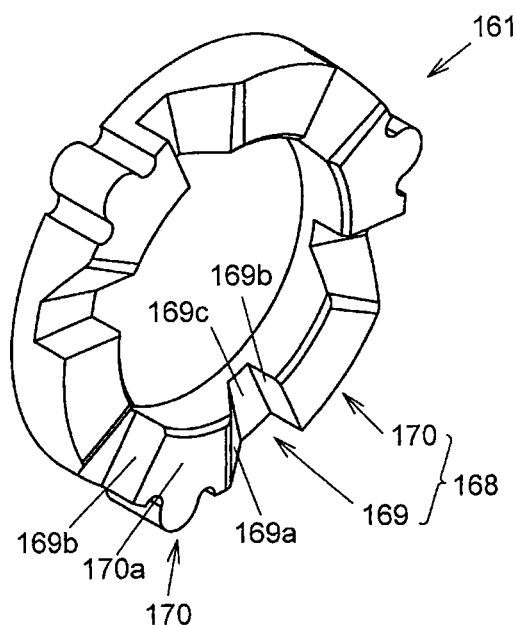
Figure 7B:
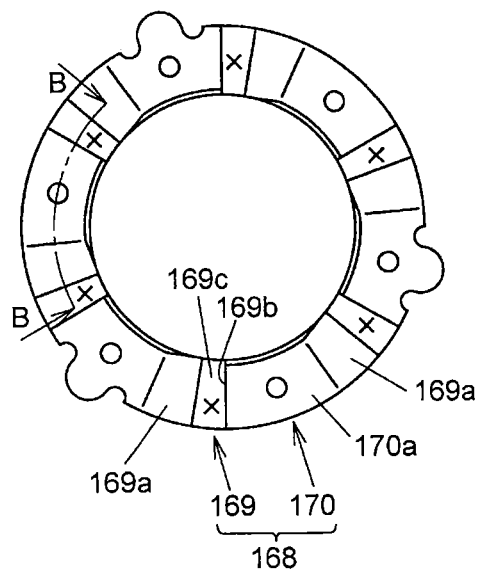
Figure 7C:
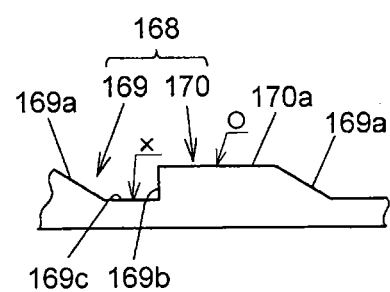

FIG. 7A to FIG. 7C show the output cam member 161. As shown in FIG. 3 and FIG. 7A to FIG. 7C, the output cam member 161 has the corrugated surface 168 that is engageable with the corrugated surface 163 of the input cam member 160. The output cam member 161 is interposed between the input cam member 160 and the pushing member 162, and is arranged so as to be movable in the axial direction (immovable in the circumferential direction). The entirety of the output cam member 161 is formed of an annular member through which the inner shaft 13 is passed.

The corrugated surface 168 has recesses 169 and projections 170 that are alternately arranged in the circumferential direction of the output cam member 161. The corrugated surface 168 is formed of a cam surface. Therefore, as the corrugated surface 168 and the corrugated surface 163 of the input cam member 160 move relative to each other in the circumferential direction, the corrugated surface 168 and the corrugated surface 163 move relative to each other in the axial direction. In the present embodiment, the corrugated surface 168 is formed of a cam surface for moving the output cam member 161 toward the main clutch 8 in the direction along the axis (rotation axis O) in accordance with the rotation of the input cam member 160.

Each recess 169 is formed of a cutout that has a trapezoidal cross section. The cutout has a pair of cutout side faces 169a, 169b, and a cutout bottom face (indicated by "x") 169c. The cutout side faces 169a, 169b are formed such that the cutout width (distance between the cutout side faces 169a, 169b) is gradually increased from one axial side of the output cam member 161 toward the other axial side of the output cam member 161 (toward the input cam member 160). The cutout bottom face 16c is located between the cutout side faces 169a, 169b.

The cutout side face 169a corresponds to the cutout side face 165a of the corrugated surface 163 of the input cam member 160, is located at the other side of the cutout bottom face 169c in the circumferential direction around the rotation axis O, and is inclined relative to the cutout bottom face 169c. The cutout side face 169a is configured to function as a cam. The cutout side face 169b corresponds to the cutout side face 165b of the corrugated surface 163 of the input cam member 160, is located at the one side of the cutout bottom face 169c in the circumferential direction around the rotation axis O, and is perpendicular to the cutout bottom face 169c. The cutout side face 169a is configured to function as a stopper.

Each projection 170 is formed of a projection that has a trapezoidal shape in cross section, and that has the cutout side face 169a, which functions as a cam in one of the two adjacent recesses 169, the cutout side face 169b, which functions as a stopper in the other one of the adjacent recesses 169, and an end face (indicated by "O") 170a located between these cutout side faces 169a, 169b.

With this configuration, in an initial state where the cutout bottom faces 165c of the corrugated surface 163 of the input cam member 160 are in contact with the end faces 170a of the output cam member 161 and the cutout bottom faces 169c of the corrugated surface 168 of the output cam member 161 are in contact with the end faces 166a of the input cam member 160, when the input cam member 160 rotates in one direction around the rotation axis O, the input cam member 160 moves around the rotation axis O with the cutout side faces 165a in contact with the cutout side faces 169a of the output cam member 161. Therefore, cam action occurs between the cutout side faces 165a, 169a each having the function as a cam. Accordingly, the second cam thrust force P2 is applied from the input cam member 160 to the output cam member 161, and the output cam member 161 moves along the rotation axis O in a direction away from the input cam member 160. In this case, movement of the output cam member 161 is continued until the end faces 166a of the corrugated surface 163 of the input cam member 160 run onto the end faces 170a of the corrugated surface 168.

Note that, when the input cam member 160 rotates in the other direction around the rotation axis O, the cutout side faces 165b and the cutout side faces 169b, each having the function as a stopper, contact each other. Therefore, cam action does not occur between both cutout side faces 165a, 169a, and the axial movement of the output cam member 161 as described above is not allowed.

The pushing member 162 has a spline portion 162a at its inner periphery and has a clutch plate pushing portion 162b, on the main clutch 8-side. The pushing member 162 is coupled to the inner shaft 13 by engaging the spline portion 162a with the spline portion 132a of the inner shaft 13 (cylindrical portion 13a). In this way, the pushing member 162 is non-rotatable and movable relative to the inner shaft 13. The pushing member 162 is rotatably supported by the output cam member 161 via a bearing 171. The entirety of the pushing member 162 is formed of an annular member through which the inner shaft 13 is passed.

The pushing member 162 is configured to move toward the main clutch 8 upon receiving the second cam thrust force P2, generated by actuating the second cam mechanism 16, from the output cam member 161. Then, the clutch plate pushing portion 162b is pushed against the input-side inner clutch plate 80 of the main clutch 8 at the other end side (right side in FIG. 3) along the rotation axis O.

Next, the operation of the driving force transmission apparatus 1 according to the present embodiment will be described with reference to FIG. 1, FIG. 3, FIG. 4 and FIG. 8A to FIG. 8C. FIG. 8A to FIG. 8C show the operation states of the input cam member and output cam member in the second cam mechanism.

Referring to FIG. 1, when the engine 202 is started while the four-wheel-drive vehicle 200 is travelling in the two-wheel-drive mode, the rotational driving force of the engine 202 is transmitted to the front differential 206 via the transmission 203 and is further transmitted from the front differential 206 to the front wheels 204L, 204R via the front wheel axle shafts 208L, 208R, and the front wheels 204L, 204R are rotated. At this time, in the driving force interrupting device 3, torque transmission between the first spline tooth portion 3a and the second spline tooth portion 3b is interrupted.

In addition, as shown in FIG. 3 (upper half), because the electromagnetic coil 90 of the electromagnetic clutch 9 is in a non-energized state, the magnetic circuit M starting from the electromagnetic coil 90 is not formed, and the situation where the armature 91 moves toward the electromagnetic coil 90 to be coupled to the housing 12 does not occur.

Therefore, the first cam thrust force P1 that is used as the clutch force of the main clutch 8 is not generated in the first cam mechanism 15, the inner clutch plates 80 and the outer clutch plates 81 of the main clutch 8 are not frictionally engaged with each other, and the rotational driving force of the engine 202 is not transmitted from the housing 12 to the inner shaft 13.

The lubricating action of the pump forming portion 36a, for the bearing 24 and the bearings 33, 153 in the two-wheel-drive mode of the four-wheel-drive vehicle 200 will be described below. When the four-wheel-drive vehicle 200 travels in the two-wheel-drive mode, the inner shaft 13 rotates due to the rotation of the rear wheel 205R. Therefore, pumping action that generates suction force in the direction of an arrow Y (shown in FIG. 3) occurs between the outer periphery 360a of the pump forming portion 36a and the inner periphery of the first housing element 20 (the portions that form the second space 181b and the third space 182b). In the two-wheel-drive mode, the inner shaft 13 rotates in a direction opposite to the rotation direction of the housing 12, so suction force caused by pumping action is larger than that in the four-wheel-drive mode.

With this structure, as shown in FIG. 4, the lubricating oil in the apparatus case 4 flows through the oil inlet passage A (the oil passages 200b, 23a, 23b) and the annular space 27, and flows into the first space 180b within the hole 18b. At this time, the bearing 24 is lubricated by the lubricating oil, between the oil passage 23b and the oil passage 200b.

Subsequently, lubricating oil that has flown into the first space 180b is introduced into the second space 181b and the third space 182b (annular space 37), flows through the annular space 37 into the hole 18c, and then flows from the hole 18c into the hole 18a and the oil flow passage 131a. At this time, the bearing 33 is lubricated by the lubricating oil in the hole 18c, and the bearing 153 is lubricated by the lubricating oil in the hole 18a.

Then, the lubricating oil that has flown into the hole 18a and the oil flow passage 131a flows into the oil outlet passage B (the oil passages 200a, 21b and the annular space 31) due to its own weight or centrifugal force generated by the rotation of the inner shaft 13, and then the lubricating oil flows from the oil outlet passage B into the apparatus case 4.

In order to shift the four-wheel-drive vehicle 200 from the two-wheel-drive mode into the four-wheel-drive mode, the propeller shaft 2 and the rear wheel axle shafts 213L, 213R are coupled to each other by the driving force transmission apparatus 1 such that torque is transmittable therebetween, and, subsequently, the front differential case 212 and the propeller shaft 2 are coupled to each other by the driving force interrupting device 3 such that torque is transmittable therebetween.

When the propeller shaft 2 and the rear wheel axle shafts 213L, 213R are coupled to each other, first, the driving force of the driving source 5 is applied to the second cam mechanism 16 to actuate the second cam mechanism 16. In this case, when the second cam mechanism 16 is actuated, the input cam member 160 rotates around the rotation axis O.

Therefore, as shown in FIG. 8A, in the initial state where the cutout bottom faces 165c of the corrugated surface 163 of the input cam member 160 are in contact with the end faces 170a of the output cam member 161 and the cutout bottom faces 169c of the corrugated surface 168 of the output cam member 161 are in contact with the end faces 166a of the input cam member 160, the input cam member 160 moves around the rotation axis O (shown in FIG. 3) with the cutout side faces 165a in contact with the cutout side faces 169a of the output cam member 161. At this time, cam action occurs between the cutout side faces 165a, 169a. Accordingly, the second cam thrust force P2 is applied from the input cam member 160 to the output cam member 161. Thus, as shown in FIG. 8B, the output cam member 161 moves along the rotation axis O in the direction of an arrow X2 in which output cam member 161 moves away from the input cam member 160. In this case, as shown in FIG. 8C, movement of the output cam member 161 is continued until the end faces 166a of the corrugated surface 163 of the input cam member 160 run onto the end faces 170a of the corrugated surface 168.

The output cam member 161 moves in the direction of the arrow X2 to move the pushing member 162 toward the main clutch 8 against the spring force of the return spring 154, and the pushing member 162 moves the main clutch 8 in a manner in which the main clutch 8 is pushed toward the first cam mechanism 15 by the clutch plate pushing portion 162b. In this way, the clearance C between adjacent two clutch plates among the inner clutch plates 80 and the outer clutch plates 81 becomes, for example, 0 (C=0).

Subsequently, when the electromagnetic coil 90 is supplied with current, the magnetic circuit M starting from the electromagnetic coil 90 is formed over the coil holder 23, the armature 91 and the front housing 18, and the armature 91 approaches the front housing 18 by the electromagnetic force F generated on the basis of current supplied to the electromagnetic coil 90. Therefore, the armature 91 is coupled to the front housing 18 via the pilot clutch 10, the rotational force of the housing 12 is transmitted to the pilot cam 150, and the pilot cam 150 rotates.

Accordingly, the first cam mechanism 15 is actuated, and the rotational force from the housing 12 is converted into the first cam thrust force P1, which is used as the clutch force of the main clutch 8, by cam action that occurs in the first cam mechanism 15. Due to the first cam thrust force P1, the main cam 151 moves in such a direction (direction of the arrow X1) that the clutch plates 80, 81 of the main clutch 8 are frictionally engaged with each other, against the spring force of the return spring 154.

As the main cam 151 moves in the direction of the arrow X1, the clutch plate pushing portion 151a pushes the main clutch 8 toward the second cam mechanism 16.

In this way, adjacent two clutch plates among the inner clutch plates 80 and the outer clutch plates 81 are frictionally engaged with each other, the rotational driving force of the engine 202 is transmitted from the housing 12 to the inner shaft 13 and further transmitted from the inner shaft 13 to the rear wheels 205L, 205R via the rear wheel axle shafts 213L, 213R, and the rear wheels 205L, 205R are rotated.

According to the above-described first embodiment, the following advantageous effects are obtained.
(1) It is possible to reduce drag torque and to improve the response of clutch action of the main clutch 8.
(2) It is possible to supply lubricating oil to the bearings 24, 33, 153 and discharge the lubricating oil from the housing 12 through pumping action.

Figure 9:
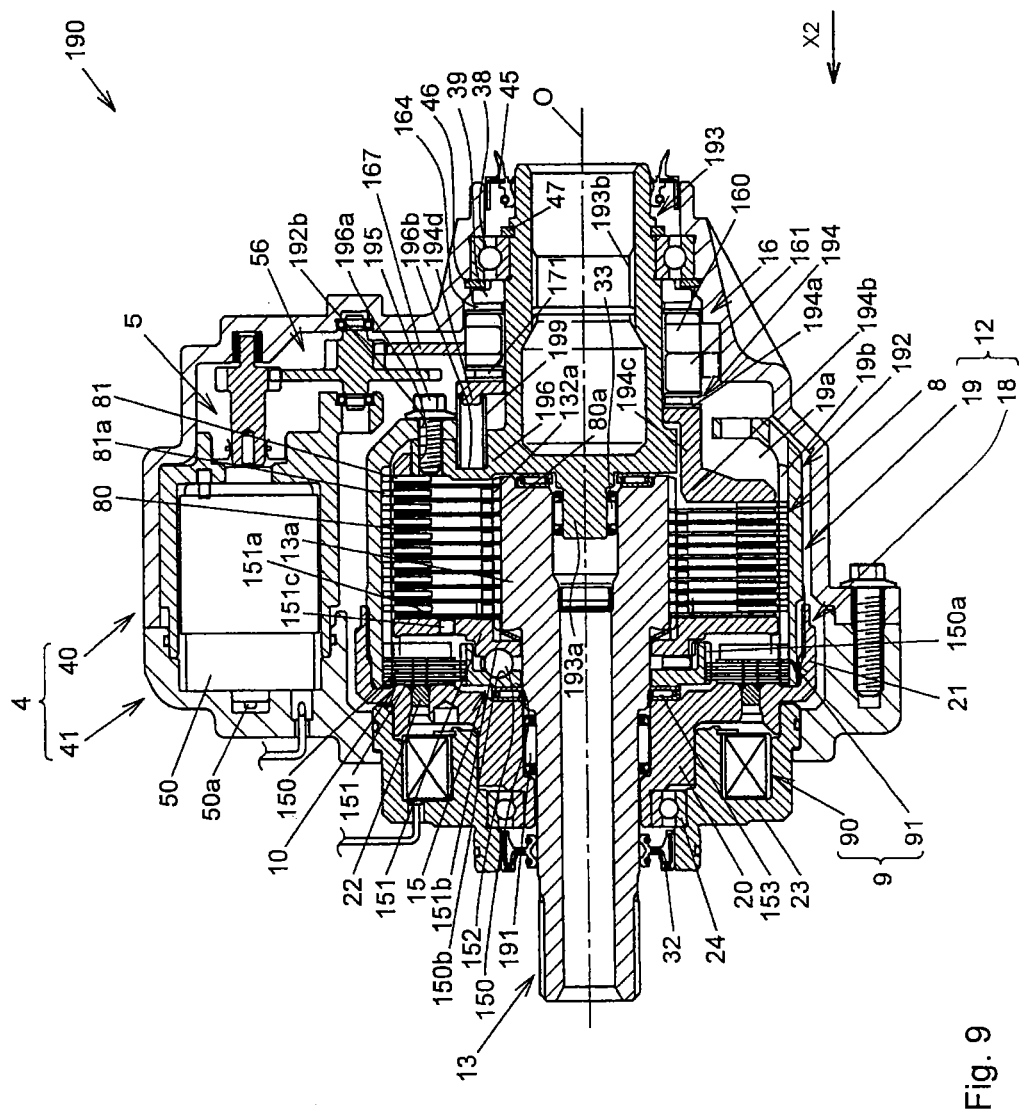
FIG. 9 is a first sectional view that shows the entirety of a driving force transmission apparatus according to a second embodiment of the invention, wherein the upper half shows a disconnected state and the lower half shows a connected state.
Figure 10:
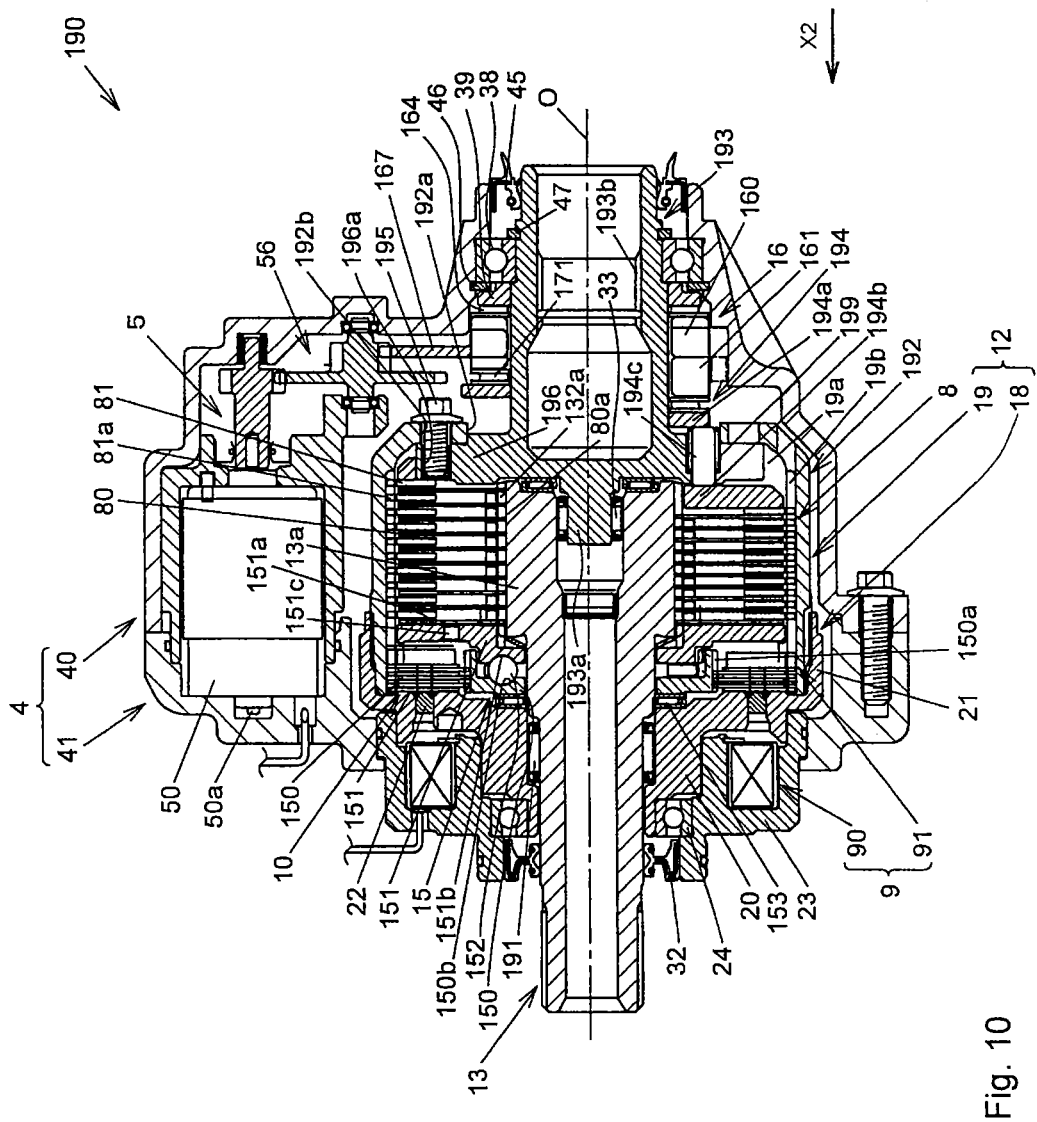
FIG. 10 is a second sectional view that shows the entirety of the driving force transmission apparatus according to the second embodiment of the invention, wherein the upper half shows a disconnected state and the lower half shows a connected state.
Figure 11:
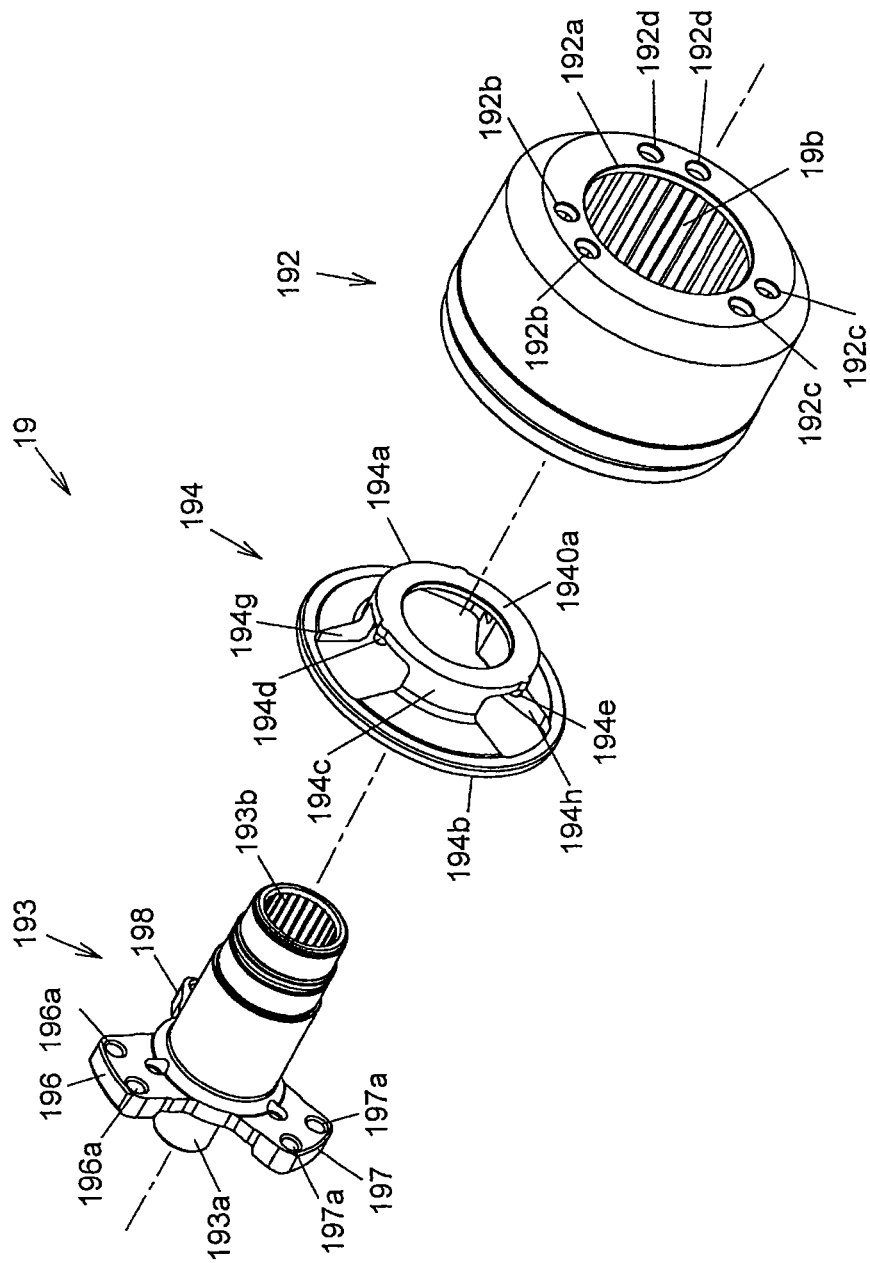
FIG. 11 is an exploded perspective view that shows a rear housing in the driving force transmission apparatus according to the second embodiment of the invention.
Figure 12:
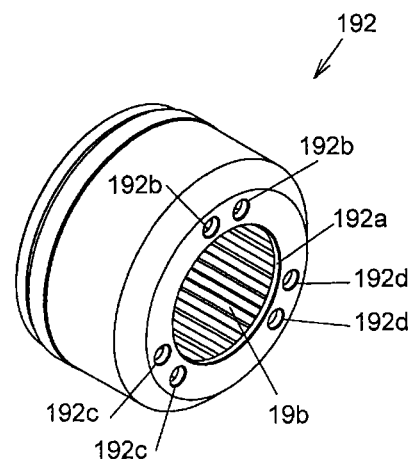
FIG. 12 is a perspective view that shows a first element of the rear housing in the driving force transmission apparatus according to the second embodiment of the invention.
Figure 13:
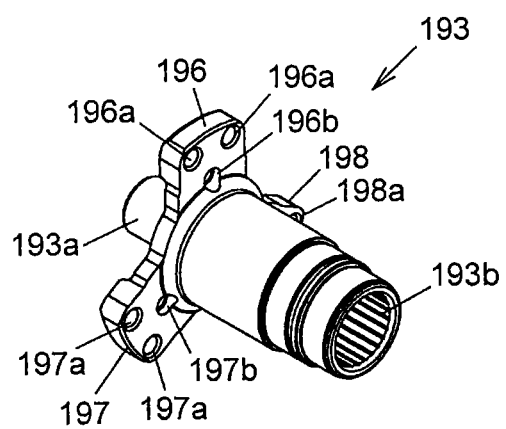
FIG. 13 is a perspective view that shows a second element of the rear housing in the driving force transmission apparatus according to the second embodiment of the invention.
Figure 14A:
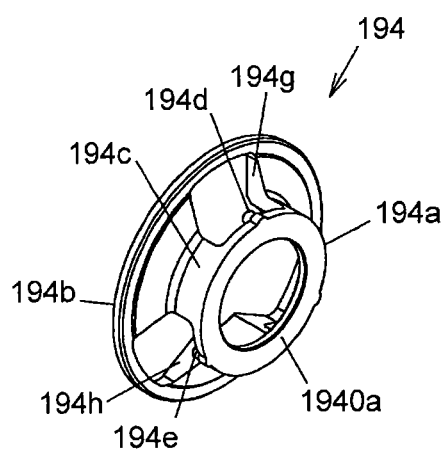
Figure 14B:
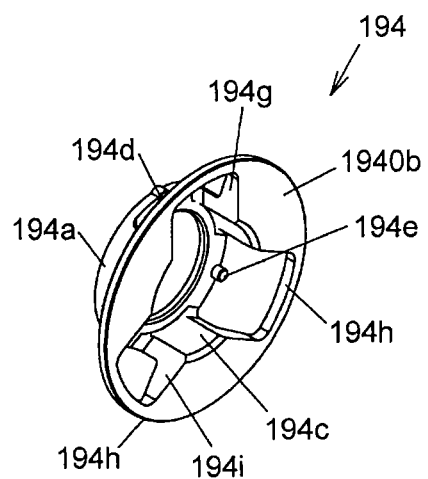

Next, a driving force transmission apparatus 190 according to a second embodiment of the invention will be described with reference to FIG. 9 to FIG. 13 and FIG. 14A and FIG. 14B. FIG. 9 and FIG. 10 show the entirety of the driving force transmission apparatus. FIG. 11 shows a rear housing. FIG. 12 shows a first element of the rear housing. FIG. 13 shows a second element of the rear housing. FIG. 14A and FIG. 14B show a third element of the rear housing. In FIG. 9 to FIG. 13 and FIG. 14A and FIG. 14B, the components having functions the same as or equivalent to those in FIG. 2 and FIG. 3 are denoted by the same reference numerals as those in FIG. 2 and FIG. 3, and the detailed description thereof is omitted.

As shown in FIG. 9 and FIG. 10, the driving force transmission apparatus 190 according to the second embodiment of the invention differs from the driving force transmission apparatus 1 according to the first embodiment (shown in FIG. 3) where the rear housing 19 is of an open type so that the accommodating space 19a is open into the inside of the apparatus case 4. The driving force transmission apparatus 190 differs from the driving force transmission apparatus 1 in that the rear housing 19 is of a closed type so that the accommodating space 19a is closed.

Therefore, the inner shaft 13 is coupled to the input shaft (rear differential 207) side, and the housing 12 is coupled to the output shaft (rear wheel axle shaft 213R) side.

In addition, the housing 12 has the front housing 18 and the rear housing 19, and is arranged along the rotation axis O.

The front housing 18 is fitted to the outer periphery of the rear housing 19. The front housing 18 is rotatably supported by the coil holder 23 via the bearing 24 and rotatably supported by the inner shaft 13 via a bearing 191.

As shown in FIG. 9 and FIG. 11, the rear housing 19 includes a first housing element (first element) 192, a second housing element (second element) 193 and a piston (third element) 194. The rear housing 19 is rotatably supported in the apparatus case 4 (case body 40) via the bearing 38. The entirety of the rear housing 19 is formed of a cylindrical member that is open toward the front housing 18.

As shown in FIG. 9 and FIG. 12, the first housing element 192 has therein the accommodating space 19a and the spline portion 19b. The first housing element 192 is arranged at the front housing 18 side in the rear housing 19, and is coupled to the second housing element 193 with fitting bolts 195. The entirety of the first housing element 192 is formed of a cylindrical box member that is open toward the front housing 18. The first housing element 192 is configured such that the main clutch 8 is accommodated in the accommodating space 19a.

An element insertion hole 192a, through which the second housing element 193 is passed, is formed in the bottom portion of the first housing element 192. In addition, three pairs of bolt insertion holes 192b to 192d, through which the fitting bolts 195 are passed, are formed in the bottom portion of the first housing element 192. The three pairs of bolt insertion holes 192b to 192d are arranged along the opening periphery of the element insertion hole 192a, at equal intervals in the circumferential direction.

As shown in FIG. 9 and FIG. 13, the second housing element 193 has a protrusion 193a that protrudes into the inner shaft 13 along the rotation axis O. The second housing element 193 is passed through the element insertion hole 192a of the first housing element 192, and is arranged at the second cam mechanism 16-side in the rear housing 19. The protrusion 193a is rotatably supported in the inner shaft 13 via the bearing 33. The entirety of the second housing element 193 is formed of a cylindrical shaft member that is open at the opposite side of the second housing element 193 from the inner shaft 13.

A spline portion 193b is formed on the inner periphery of the second housing element 193. The spline portion 193b is used to couple the rear wheel axle shaft 213R to the second housing element 193. Flanges 196 to 198 having a generally rectangular planar shape are integrally formed with the second housing element 193. The flanges 196 to 198 protrude from the outer periphery of the second housing element 193.

End faces of the flanges 196 to 198 face the bottom portion of the first housing element 192. The flanges 196 to 198 are arranged at equal intervals in the circumferential direction of the second housing element 193. Three pairs of threaded holes 196a to 198a are formed in the flanges 196 to 198, respectively. The three pairs of threaded holes 196a to 198a correspond to the three pairs of bolt insertion holes 192b to 192d (shown in FIG. 12), and the fitting bolts 195 are screwed (fastened) into the threaded holes 196a to 198a. In addition, spring receiving holes 196b to 198b are formed in the flanges 196 to 198, respectively. The spring receiving holes 196b to 198b receive one-side end portions of return springs 199, at positions near the outer peripheral portion of the second housing element 193. The return springs 199 each have spring force in the direction along the rotation axis O, and are arranged between the second housing element 193 (spring receiving holes 196b to 198b) and the piston 194 (spring receiving portions 194d to 194f).

As shown in FIG. 9, FIG. 14A and FIG. 14B, the piston 194 has a cam thrust force receiving portion 194a, a cam thrust force applying portion 194b and a coupling portion 194c. The piston 194 is passed through the element insertion hole 192a, and is arranged so as to be movable on the outer periphery of the second housing element 193, at positions inside and outside of the first housing element 192. The piston 194 is configured to apply pushing force to the main clutch 8 upon receiving the second cam thrust force P2 from the output cam member 161 of the second cam mechanism 16.

The cam thrust force receiving portion 194a has a planar receiving face 1940a that receives the second cam thrust force P2 from the output cam member 161 of the second cam mechanism 16. The cam thrust force receiving portion 194a is located at one side (the second cam mechanism 16-side) in the piston 194, and is accommodated in the apparatus case 4 (case body 40). The entirety of the cam thrust force receiving portion 194a is formed of an annular member that faces an end face (end face on the opposite side of the output cam member 161 from the corrugated surface 168 shown in FIG. 7) of the output cam member 161.

A plurality of (three in the present embodiment) spring receiving portions 194d to 194f are integrally formed with the cam thrust force receiving portion 194a. The spring receiving portions 194d to 194f protrude from the inner face (surface on the cam thrust force applying portion 194b-side) of the cam thrust force receiving portion 194a, and receive the other end portions of the return springs 199. The spring receiving portions 194d to 194f are arranged at equal intervals in the circumferential direction of the cam thrust force receiving portion 194a.

The cam thrust force applying portion 194b has a planar application face 1940b that applies the second cam thrust force P2, received by the cam thrust force receiving portion 194a, to the main clutch 8 (outer clutch plate 81). The cam thrust force applying portion 194b is located at the other side (the main clutch 8-side) in the piston 194, and is accommodated in the first housing element 192 (accommodating space 19a). The entirety of the cam thrust force applying portion 194b is formed of an annular member that faces the outer clutch plate 81 at the endmost (rightmost end in FIG. 9) in the main clutch 8. With this configuration, the second cam thrust force P2 received by the receiving face 1940a of the cam thrust force receiving portion 194a is applied from the application face 1940b of the cam thrust force applying portion 194b to the outer clutch plate 81 of the main clutch 8, while being dispersed in the circumferential direction.

A plurality of (three in the present embodiment) through-holes 194g to 194i are formed in the cam thrust force applying portion 194b and extend into the coupling portion 194c. The through-holes 194g to 194i are open toward both sides along the axis of the cam thrust force applying portion 194b (rotation axis O shown in FIG. 9), and are arranged at equal intervals around the rotation axis O. With this configuration, the flanges 196 to 198 of the second housing element 193 are allowed to move through the through-holes 194g to 194i when the piston 194 moves, so the piston 194 is able to move along the rotation axis O.

The area of the application face 1940b of the cam thrust force applying portion 194b is set larger than the area of the receiving face 1940a of the cam thrust force receiving portion 194a. With this configuration, it is possible to apply the second cam thrust force P2, received by the receiving face 1940a of the cam thrust force receiving portion 194a, from the application face 1940b of the cam thrust force applying portion 194b to the outer clutch plate 81 of the main clutch 8 after pressure placed on a unit area is reduced.

The coupling portion 194c is located at the axially middle portion of the piston 194, and is coupled to the cam thrust force receiving portion 194a and the cam thrust force applying portion 194b. The entirety of the coupling portion 194c is formed of a cylindrical member that is open toward both sides in the axial direction. The coupling portion 194c is configured to transmit the second cam thrust force P2 from the cam thrust force receiving portion 194a to the cam thrust force applying portion 194b.

In the thus configured driving force transmission apparatus 190, when the second cam mechanism 16 is actuated, the output cam member 161 moves in the direction of the arrow X2 to push the cam thrust force receiving portion 194a of the piston 194 by the second cam thrust force P2, and, accordingly, the piston 194 moves, against the spring forces of the return springs 199, in the direction in which the output cam member 161 moves.

In this case, the receiving face 1940a of the cam thrust force receiving portion 194a of the piston 194 receives the second cam thrust force P2 from the output cam member 161, and the second cam thrust force P2 is transmitted from the receiving face 1940a of the cam thrust force receiving portion 194a to the application face 1940b of the cam thrust force applying portion 194b via the coupling portion 194c. The application face 1940b of the cam thrust force applying portion 194b pushes the outer clutch plate 81 at the endmost (rightmost end in FIG. 9) in the main clutch 8 to move the main clutch 8 toward the first cam mechanism 15.

In this way, as in the driving force transmission apparatus 1 according to the first embodiment, the clearance C between adjacent two clutch plates among the inner clutch plates 80 and the outer clutch plates 81 becomes o (C=0).

In the driving force transmission apparatus 190 according to the present embodiment, the through-holes 194g to 194i are formed in the piston 194 (the cam thrust force applying portion 194b and the coupling portion 194c). When the second cam mechanism 16 is actuated, the flanges 196 to 198 of the second housing element 193 are allowed to move through the through-holes 194g to 194i to allow the piston 194 to move on the outer periphery of the second housing element 193. Therefore, it is possible to obtain the piston 194 having a simple shape in which the cam thrust force receiving portion 194a, the cam thrust force applying portion 194b and the coupling portion 194c are integrally formed.

In addition, in the driving force transmission apparatus 190 according to the present embodiment, the second cam thrust force P2 received by the receiving face 1940a of the cam thrust force receiving portion 194a when the second cam mechanism 16 is actuated is applied from the application face 1940b of the cam thrust force applying portion 194b to the outer clutch plate 81 of the main clutch 8 while being dispersed in the circumferential direction. Therefore, uneven abrasion of the outer clutch plate 81 is suppressed.

Next, a method of assembling the rear housing 19 of the driving force transmission apparatus 190 according to the present embodiment will be described with reference to FIG. 15A and FIG. 15B and FIG. 16A to FIG. 16C.

In the method of assembling the rear housing according to the present embodiment, the processes of "assembling the piston", "assembling the housing elements" and "fitting the housing elements" are sequentially carried out, so these processes will be sequentially described.

Figure 15A:
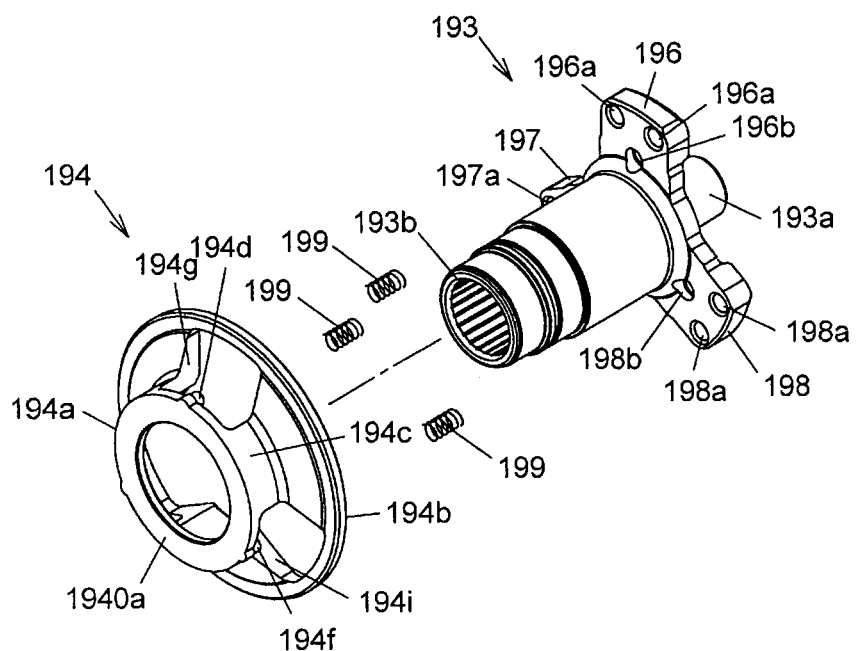
FIG. 15A and FIG. 15B are perspective views that show a method of assembling a piston in the driving force transmission apparatus according to the second embodiment of the invention.

The process of assembling the piston will be described below. First, as shown in FIG. 15A, the second housing element 193 is arranged along the axis of the piston 194, and the return springs 199 are arranged between the spring receiving portions 194d to 194f of the piston 194 and the spring receiving holes 196b to 198b of the flanges 196 to 198 of the second housing element 193.

Figure 15B:
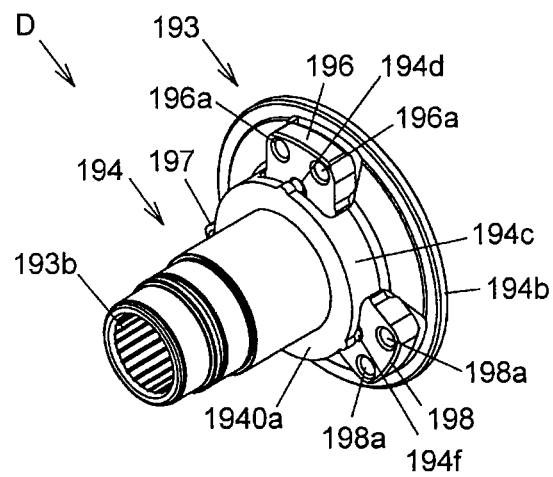

Subsequently, as shown in FIG. 15B, one-side end portion (end portion on the opposite side of the second housing element 193 from the end portion at which the flanges 196 to 198 are formed) of the second housing element 193 is passed through the center portion (hole) of the piston 194, and the flanges 196 to 198 are passed through the through-holes 194g to 194i of the piston 194, respectively. In this way, the piston 194 is retained by the second housing element 193. In this case, when the piston 194 is retained by the second housing element 193, the piston 194 is assembled, and a piston assembly D that incorporates the return springs 199 interposed between the spring receiving portions 194d to 194f and the spring receiving holes 196b to 198b is formed.

Figure 16A:
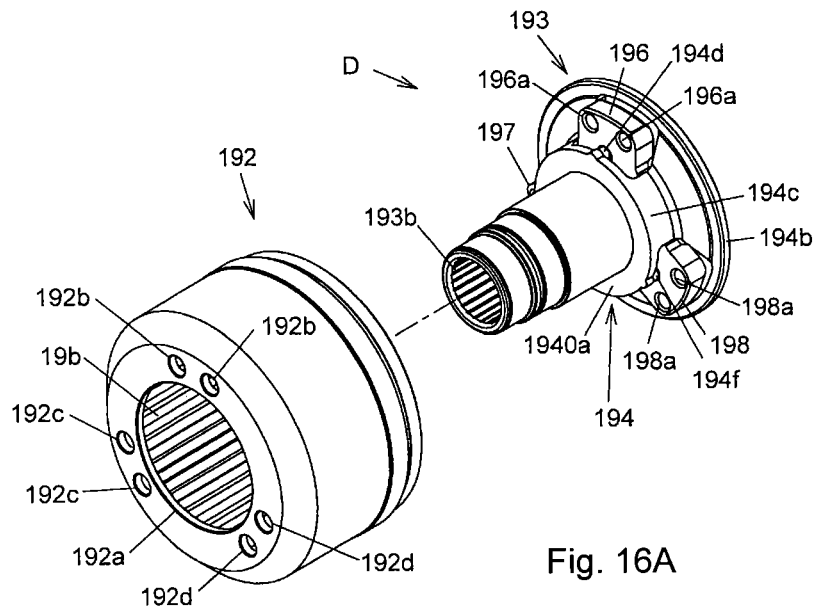
FIG. 16A to FIG. 16C are perspective views that show a method of assembling the housing elements in the driving force transmission apparatus according to the second embodiment of the invention.

The process of assembling the housing elements will be described below. First, as shown in FIG. 16A, the piston assembly D is arranged along the axis of the first housing element 192.

Figure 16B:
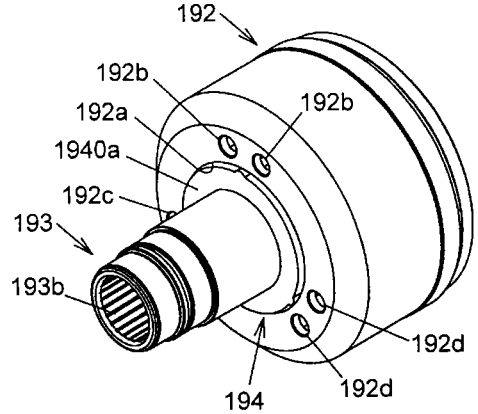

Subsequently, as shown in FIG. 16B, one-side end portion of the second housing element 193 in the piston assembly D is passed through the element insertion hole 192a from the opening portion of the first housing element 192 toward the bottom portion of the first housing element 192. Then, the bolt insertion holes 192b to 192d of the first housing element 192 are aligned with the threaded holes 196a to 198a of the flanges 196 to 198 of the second housing element 193.

Figure 16C:
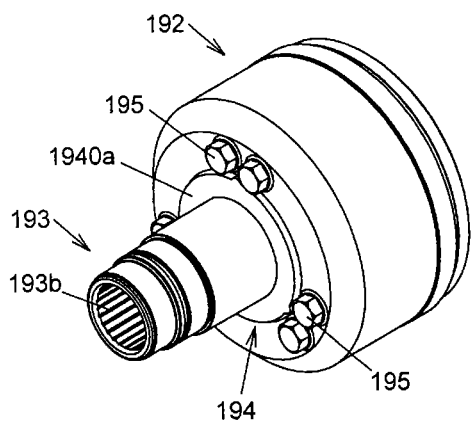

Then, as shown in FIG. 16C, the fitting bolts 195 are passed through the bolt insertion holes 192b to 192d of the first housing element 192 and are screwed to the threaded holes 196a to 198a of the flanges 196 to 198 of the second housing element 193. In this case, when the fitting bolts 195 are screwed to the threaded holes 196a to 198a of the flanges 196 to 198, the rear housing 19 that incorporates the return springs 199 and that has the first housing element 192, the second housing element 193 and the piston 194 is assembled.

According to the above-described second embodiment, advantageous effects similar to those of the first embodiment are obtained.

The driving force transmission apparatus according to the invention has been described on the basis of the above embodiments; however, the invention is not limited to the above embodiments. It is possible to implement the invention in various other embodiments within the scope of the invention. For example, the following alternative embodiment is also applicable.

In the above embodiments, the description is made on the case where the second cam thrust force P2 for reducing the clearance C between the inner clutch plates 80 and the outer clutch plates 81 to, for example, 0 (C=0) by actuating the second cam mechanism 16 is generated. However, the invention is not limited to this configuration. A second cam thrust force P2 by which the clearance between adjacent clutch plates in the main clutch 8 is reduced as compared with that in an initial state by actuating the second cam mechanism 16 is generated. That is, the invention may be implemented in various forms as long as the second cam mechanism generates second cam thrust force for reducing the clearance between adjacent clutch plates of the first clutch.

What is claimed is:

1. A driving force transmission apparatus, comprising:
a first rotary member that is rotated by a driving source of a vehicle;
a second rotary member that is arranged along a rotation axis of the first rotary member so as to be rotatable relative to the first rotary member;
a first clutch that is interposed between the second rotary member and the first rotary member, and that couples the first rotary member and the second rotary member to each other such that the first rotary member and the second rotary member are disengageable from each other;

a second clutch that is arranged next to the first clutch along the rotation axis;

a first cam mechanism that converts rotational force from the first rotary member into first cam thrust force that is used as clutch force of the first clutch when the first cam mechanism is actuated through clutch action of the second clutch; and a second cam mechanism that is actuated prior to conversion of the rotational force from the first rotary member into the first cam thrust force by the first cam mechanism, and that generates second cam thrust force for reducing an interval between clutch plates of the first clutch, wherein the second cam mechanism has an input cam member that rotates upon receiving rotational force that is used as actuating force for the input cam member from a cam actuating driving source that is different from the driving source, and an output cam member that generates the second cam thrust force between the output cam member and the input cam member and outputs the second cam thrust force.

2. The driving force transmission apparatus according to claim 1, wherein the second cam mechanism is arranged at a position at which the second cam mechanism faces the first cam mechanism via the first clutch along the rotation axis.

3. The driving force transmission apparatus according to claim 1, wherein:

the second cam mechanism has corrugated surfaces that are formed in the input cam member and the output cam member and that are engageable with each other; and the corrugated surface of the input cam member and the corrugated surface of the output cam member are formed of cam surfaces that are used to move the output cam member toward the first clutch as the input cam member rotates.

4. The driving force transmission apparatus according to claim 1, wherein:

the first cam mechanism includes an input ball cam member that rotates upon receiving the rotational force from the first rotary member, an output ball cam member that generates the first cam thrust force between the output ball cam member and the input ball cam member and that outputs the first cam thrust force to the first clutch, and a cam follower that is interposed between the output ball cam member and the input ball cam member; and the output ball cam member is arranged at a position at which the output ball cam member receives spring force of a return spring interposed between the output ball cam member and the output cam member of the second cam mechanism, in such a direction that the output ball cam member moves away from the first clutch.

5. The driving force transmission apparatus according to claim 1, wherein the input cam member of the second cam mechanism is coupled to the cam actuating driving source via a gear transmission mechanism.

6. The driving force transmission apparatus according to claim 5, wherein:

the input cam member of the second cam mechanism has a protruding piece that protrudes from and extends along an outer periphery of the input cam member; and external teeth that constitute part of the gear transmission mechanism are formed in the protruding piece.

7. The driving force transmission apparatus according to claim 1, wherein:

the second rotary member includes a first element that accommodates the first clutch, a second element that is coupled to the first element, and a third element that receives the second cam thrust force from the output cam member and that applies the second cam thrust force to the first clutch; and the third element is arranged such that the second element is passed through the third element and the third element is movable on an outer periphery of the second element.

8. The driving force transmission apparatus according to claim 7, wherein the second rotary member is formed of an annular cam thrust force receiving portion at which the third element receives the second cam thrust force from the output cam member, an annular cam thrust force applying portion that applies the cam thrust force to the first clutch, and a cylindrical coupling portion that couples the cam thrust force applying portion and the cam thrust force receiving portion to each other.

9. The driving force transmission apparatus according to claim 8, wherein the second rotary member is configured such that an area of an application face of the cam thrust force applying portion is larger than an area of a receiving face of the cam thrust force receiving portion.

10. The driving force transmission apparatus according to claim 7, wherein in the second rotary member, a return spring having spring force in a direction along the rotation axis is interposed between the second element and the third element.

* * * * *